(12) United States Patent
Langtry et al.

(10) Patent No.: US 11,948,697 B2
(45) Date of Patent: Apr. 2, 2024

(54) ORBITAL CONFINEMENT FUSION DEVICE

(71) Applicant: Avalanche Energy Designs, Inc., Seattle, WA (US)

(72) Inventors: Robin Langtry, Seattle, WA (US); Brian Riordan, Seattle, WA (US)

(73) Assignee: Avalanche Energy Designs, Inc., Seattle, WA (US)

( * ) Notice: Subject to any disclaimer, the term of this patent is extended or adjusted under 35 U.S.C. 154(b) by 0 days.

(21) Appl. No.: 18/146,954

(22) Filed: Dec. 27, 2022

(65) Prior Publication Data

US 2023/0140886 A1    May 11, 2023

Related U.S. Application Data

(63) Continuation of application No. 17/766,449, filed as application No. PCT/US2021/048890 on Sep. 2, 2021, now Pat. No. 11,568,999.

(60) Provisional application No. 63/073,812, filed on Sep. 2, 2020.

(51) Int. Cl.
  *G21B 1/05*    (2006.01)
(52) U.S. Cl.
  CPC ..................... *G21B 1/05* (2013.01)
(58) Field of Classification Search
  CPC ........................................................ G21B 1/05
  USPC ........................................ 376/127, 143, 144
  See application file for complete search history.

(56) References Cited

U.S. PATENT DOCUMENTS

| 10,269,458 B2 | 4/2019 | Wong |
| 2006/0088138 A1 | 4/2006 | Jouanneau |
| 2011/0085632 A1 | 4/2011 | Klein et al. |
| 2015/0380113 A1* | 12/2015 | Wong ............... G21B 1/05 376/133 |
| 2019/0206578 A1 | 7/2019 | Wong |

(Continued)

FOREIGN PATENT DOCUMENTS

| JP | 2001133569 A | 5/2001 |
| JP | 3867972 B2 | 1/2007 |
| WO | 2022046953 A2 | 3/2022 |

OTHER PUBLICATIONS

Third party observation dated Nov. 15, 2022, issued in corresponding International Patent Application No. PCT/US2021/48890 filed Sep. 2, 2021, 10 pages.

(Continued)

*Primary Examiner* — Jack W Keith
*Assistant Examiner* — Daniel Wasil
(74) *Attorney, Agent, or Firm* — Christensen O'Connor Johnson Kindness PLLC

(57) ABSTRACT

Systems, devices, and methods for generating an orbital confinement fusion reaction are described. An orbital confinement fusion device can include a cathodic inner electrode defining a longitudinal axis of the device. The inner electrode can include an emitter material. The orbital confinement fusion device can include an anodic outer electrode, concentric with the longitudinal axis and defining a chamber between the inner electrode and the outer electrode. The orbital confinement fusion device can also include a plurality of magnetic field generators disposed in a coaxial arrangement relative to the longitudinal axis. The plurality of magnetic field generators can be configured to form a magnetic field parallel to the longitudinal axis in the chamber.

18 Claims, 9 Drawing Sheets

(56) References Cited

U.S. PATENT DOCUMENTS

2019/0318832 A1    10/2019  Van Drie

OTHER PUBLICATIONS

International Search Report and Written Opinion dated Feb. 25, 2022, issued in corresponding International Patent Application No. PCT/US2021/48890 filed Sep. 2, 2021, 8 pages.

* cited by examiner

ORBITAL CONFINEMENT FUSION DEVICE

CROSS-REFERENCES TO RELATED APPLICATIONS

This application is a continuation of U.S. patent application Ser. No. 17/766,449, filed Apr. 4, 2022, which claims the benefit of International Patent Application No. PCT/US2021/048890, filed Sep. 2, 2021, which claims the benefit of U.S. Provisional Patent Application No. 63/073,812, filed Sep. 2, 2020, the contents of which are hereby expressly incorporated by reference in their entirety.

BACKGROUND

Nuclear fusion is a reaction in which two or more light atoms combine to form one or more heavier atoms. Due to the mass defect, energy is released when elements lighter than iron-56 or nickel-62 are fused as described by $E=mc^2$. Nuclear fusion begins when two or more nuclei overcome the coulomb barrier created by repulsive electrostatic force between positive nuclei, bringing the nuclei into spatial proximity. Fusion occurs as a result of quantum tunneling, allowing the nuclei to bind into a nuclide fusion product, and is accompanied by a release of fusion energy.

One approach to generating a fusion reaction, referred to as thermonuclear fusion, involves heating fuel atoms beyond ionization temperatures, increasing ion density and thermal kinetic energy of the ions to the point that fuel nuclei will fuse. In contrast, orbital confinement fusion involves accelerating ions to elicit nuclear fusion by increasing the kinetic energies of ions to a point where collisions result in nuclear fusion.

Fusion has long been an attractive source of energy as the reaction does not produce greenhouse gasses, there is no long-lived radioactive waste, there is a low risk of proliferation, there is no risk of meltdown and the elements required are widely available and practically inexhaustible. Despite being a subject of significant research effort and investment since the theoretical formulation of the physics underlying nuclear fusion, methods to initiate, control and maintain fusion reactions to produce useful energy remain elusive. To address limitations imposed by electron collisional losses, fusion research has focused on thermonuclear fusion. Consequently, fusion reactor development has been dominated by plasma confinement technologies to contain "hot" plasmas, describing a plasma where electrons and ions are in thermal equilibrium at average temperatures on the order of 100 million Kelvin. Controlled thermonuclear fusion involves maintaining hot plasmas at densities and for confinement times for long enough to generate a positive net energy output, posing a fundamental challenge to the successful implementation of nuclear fusion.

At the present time, magnetic confinement and inertial confinement are the main targets of research efforts to achieve controlled thermonuclear fusion. Research into both inertial confinement and magnetic confinement methods typically involves international and multi-institutional collaborative research efforts, resulting in large facilities, capital investments exceeding billions of US dollars, and decades-long design cycles. On a technical level, such projects still struggle with plasma instability, material limitations, and low energy yields. No fusion reactor has yet to achieve the break-even condition. For at least these reasons, there is a need for plasma fusion devices that achieve net energy gain, with a smaller footprint, which can be built and maintained by individuals or single entities, rather than organizations at the consortium or government scale.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Systems, devices, and methods for generating an orbital confinement fusion reaction are described. An orbital confinement fusion device may include a cathodic inner electrode defining a longitudinal axis of the device. The inner electrode may include an emitter material. The orbital confinement fusion device may include an anodic outer electrode, concentric with the longitudinal axis and defining a chamber between the inner electrode and the outer electrode. The orbital confinement fusion device may also include a plurality of magnetic field generators disposed in a coaxial arrangement relative to the longitudinal axis. The plurality of magnetic field generators may be configured to form a magnetic field parallel to the longitudinal axis in the chamber.

In some embodiments, the inner and outer electrodes are solids of revolution, symmetric about the longitudinal axis, and may be shaped to form a substantially logarithmic electrostatic field in the chamber when energized. The inner electrode may be characterized by an aspect ratio greater than one along the longitudinal axis. The outer electrode may have length along the longitudinal axis greater than a largest diameter of the inner electrode. The outer electrode may include a first anode shell and a second anode shell, disposed laterally relative to the longitudinal axis and a dielectric insulator disposed between and electrically isolating the first anode shell and the second anode shell.

In some embodiments, the magnetic field is characterized by a magnetic field strength exceeding a Hull cut-off condition to trap electrons in an orbital path about the inner electrode within the chamber. The plurality of magnetic field generators may be or include permanent magnets. The plurality of magnetic field generators may be or include electromagnets. The orbital confinement fusion device may also include a high voltage power source, electrically coupled with the inner electrode, and operative in a range from about 50 kV DC to about 4.0 MV DC. The inner electrode may define a first end and a second end. The orbital confinement fusion device may further include a first dielectric insulator mechanically coupled with the first end and isolating the first end from the outer electrode and a second dielectric insulator disposed in the chamber between the second end and the outer electrode and isolating the second end from the outer electrode. The first dielectric insulator may define an insulating cavity and may electrically isolate the high voltage power source from the outer electrode.

In some embodiments, the outer electrode defines an aperture, an alignment of the aperture defining an injection trajectory, the injection trajectory corresponding to a pitch angle of entry of a stable elliptical orbit of an ion of a given mass-to-charge ratio about the inner electrode. The ion may be, but is not limited to, a proton (m/z=1), a deuterium ion (m/z=2), a tritium ion (m/z=3), lithium-6 ion (m/z=6), or a boron-11 ion (m/z=11). The outer electrode may further define a port fluidly coupled with the chamber and an external environment. The port may be configured to fluidly couple with a vacuum system. The emitter material may be disposed on the inner electrode or integrated in the inner electrode. The emitter material may be configured to inject electrons into the chamber when the inner electrode is energized. The emitter material may be or include a thermionic emitter material.

In some embodiments, the orbital confinement fusion device further includes an image current device electrically coupled with the outer electrode and configured to generate electrical energy from a plurality of charged particles orbiting the inner electrode, the plurality of charged particles exhibiting harmonic axial motion aligned with the longitudinal axis. The orbital confinement fusion device may further include a fluid conduit disposed in the outer electrode or the inner electrode. The orbital confinement fusion device may be characterized by physical dimensions on the order of tens of centimeters. In some embodiments, the orbital confinement fusion device is electrically coupled with an electrical power system configured to receive electrical power or heated coolant from the device.

A method of generating orbital confinement fusion energy in a fusion device described above may include energizing the inner electrode to a voltage from about 50 kV DC to about 4.0 MV DC, thereby forming a logarithmic electrostatic field between the inner electrode and the outer electrode and injecting a plurality of electrons into the chamber. The method may include injecting a beam of fuel ions into the chamber and at an angle tangential to a surface of the inner electrode, causing the fuel ions to interact with the electrostatic field and to enter an elliptical orbit about the inner electrode. The method may also include generating a magnetic field aligned with the longitudinal axis using the plurality of magnetic field generators, the magnetic field characterized by an intensity corresponding to a Hull cut-off condition and redirecting the electrons back toward the inner electrode.

In some embodiments, the method further includes flowing a coolant through the fluid conduit, heating the coolant through contact with the outer electrode, and generating electricity using the heated coolant. The method may further include applying a radio-frequency (RF) voltage signal to the outer electrode using a charge image circuit, wherein a frequency of the RF voltage signal corresponds to an oscillation of charged particles in the chamber along a direction aligned with the longitudinal axis. The method may further include generating an RF current using the charge image circuit and generating a direct current from the RF current using an RF-to-DC rectifier circuit.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
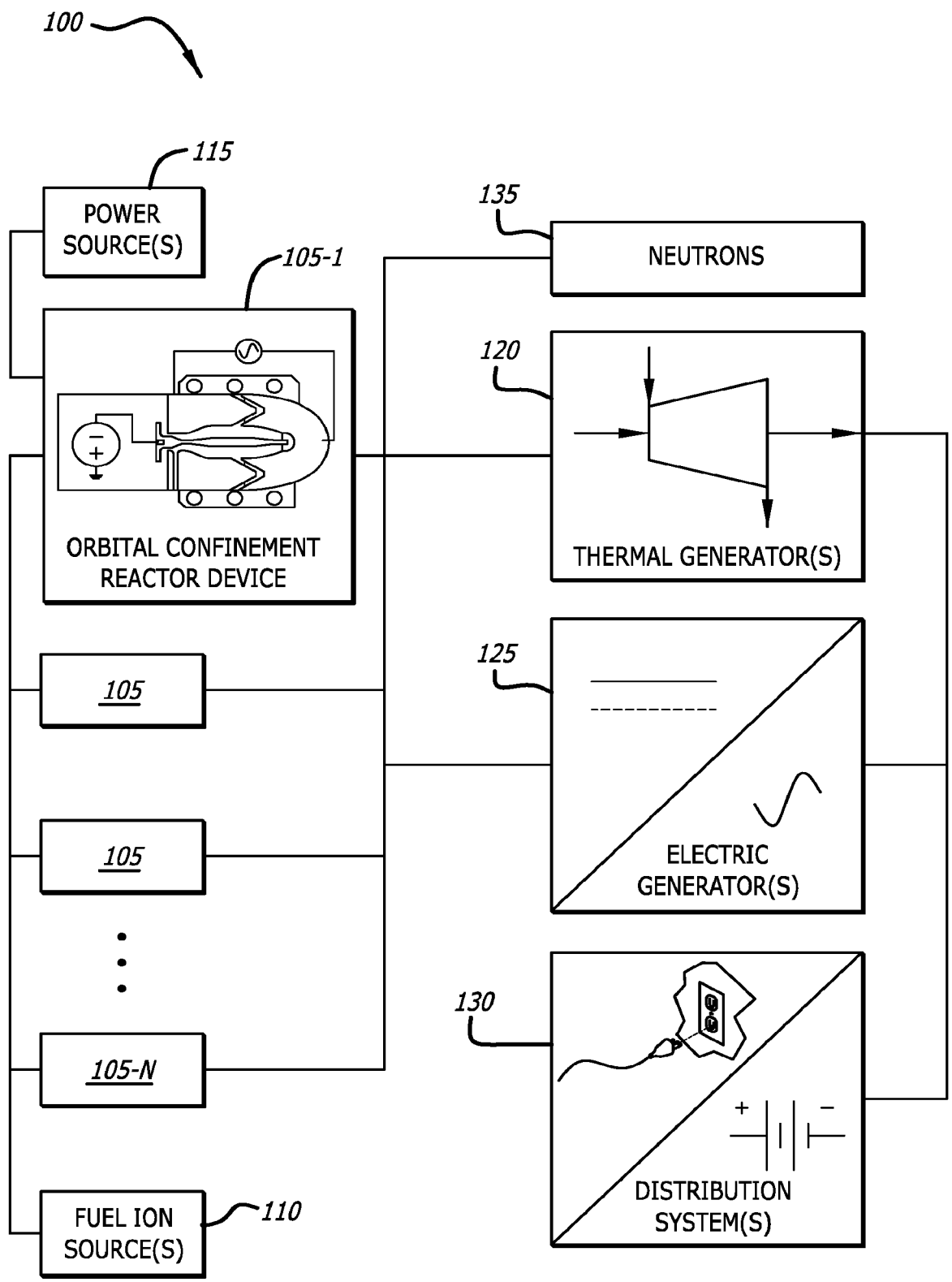
FIG. 1 is a schematic diagram illustrating an example system for generating energy using an orbital confinement reactor device, in accordance with some embodiments of the present disclosure.

Like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While illustrative embodiments have been illustrated and described, it will be appreciated that various changes can be made therein without departing from the spirit and scope of the invention.

Introduction:

The concept of orbital ion confinement was first proposed in 1923 in the Kingdon trap. A Kingdon trap consists of a thin central wire, an outer cylindrical electrode and isolated end cap electrodes at both ends. A static applied voltage between the wire and the electrode results in a radial logarithmic potential therebetween. Ions are stored with a finite angular momentum about the central wire and the applied electric field in the device allows for stable ion trajectories over relatively long periods of time. The Knight trap, a variant of the Kingdon trap, modifies the outer electrode to confine the ions in orbit about the trap cylindrical axis with harmonic axial motion. The harmonic axial motion is characteristic of the charge-to-mass ratio (Z/m) of the confined ions and can be measured via image current radio frequency (RF), where a combination of ions of different mass generate a convoluted RF signal that is deconvoluted using Fourier transfer techniques. The orbitrap is a refinement of the Knight trap geometry that eliminates cross-coupling terms between ion radial and axial motion resulting in a highly sensitive mass spectrometer.

The Kingdon trap, Knight trap, and the orbitrap represent sensitive instruments for detecting and differentiating ions by mass but are inherently unable to extract energy or neutrons from nuclear fusion. The limitation is due, at least in part, to operating parameters such as pressure, temperature, electrostatic field strength, magnetic field strength, ion density or space charge, ion energy distribution, or the like. Additionally, ion-mass sensors isolate ions from an ion source, which is typically an ionizing plasma formed using an analyte as in plasma-mass spectrometry systems (e.g., ICP-MS), where the ions are not suitable fusion fuels. Instead, the space between the electrodes is maintained free of electrons, which serves at least in part to improve the sensitivity of the instrument by lowering ion density and increasing harmonic axial motion for improved signal resolution. As such, an orbital confinement fusion device represents a significant departure from the structure and operation of an orbitrap-type mass sensor, rather than a modification of operating parameters or an inclusion of one or more discrete structural elements to add new functionality.

Nuclear fusion devices based on orbital confinement, for example, generate energy by stimulating fusion events between light ions to form heavier ions. Described in terms of a fusion reaction rate constant "k," orbital confinement fusion includes confining fuel and reaction product ions together over relatively long periods of time of approximately one second or more and relatively long particle track distances on the order of $1 \times 10^8$ cm. Confining ions in this way serves to increase the number of energy transferring scattering events to a point where fusion reactions become more probable, described in terms of collisional cross-sections below. Orbital ion confinement can achieve ion confinement times, distances, and energies to elicit nuclear fusion. Kingdon/Orbitrap mass sensors can achieve relatively high space charges, on the order of $2 \times 10^{10}$ atoms/cm$^3$, compared to other ion trap designs, but cannot achieve the space charges generated in an orbital confinement reactor device, on the order of $1 \times 10^{12}$-$1 \times 10^{15}$ atoms/cm$^3$.

An orbital confinement fusion reactor, by contrast, increases ion space charge by introducing and confining electrons in orbit with ions around a central electrode. Injecting space charges via electrons serves to offset the positive ion space charge, increasing achievable ion density, at least in part by screening ion-ion repulsion. Electron confinement can be facilitated by a different physical mechanism than that used for ion confinement, as an approach to providing independent control of ion and electron orbits in the device and thereby improving rector control and improving reactor efficiency. For example, a magnetic field can be generated parallel to a longitudinal axis of the orbital confinement reactor, as in a magnetron-type magnetic field generator, that exceeds the Hull cutoff condition, bending electron trajectories in a direction orthogonal to the magnetic field direction, and thereby inducing curved magnetron-type motion of electrons around the central electrode in the same direction as orbiting ions, thereby reducing two-stream instability of the ion beam and/or fusion plasma and reducing losses attributable to electron-ion collisions.

The operating window of fusion reactor devices can be determined at least in part in terms of a fusion triple product of plasma density, temperature, and confinement time (nTτ). As a figure of merit, the triple product describes conditions for fusion reactions to occur controllably and reproducibly while generating net positive energy, referred to as the Lawson criterion. Density, temperature, and confinement time can be controlled through operational parameters of the reactor device. For example increasing the ion flux into a fusion reactor from a fuel ion source can increase the plasma density, while increasing electrostatic field strength can increase temperature by accelerating ions to higher average speeds. The parameters are coupled, such that increasing one parameter can affect another parameter. For example, increasing plasma density can increase collisional losses and can reduce confinement time as ions impact reactor surfaces. The triple product can be used to derive electrostatic field strength, magnetic field strength, ion flux, and electron flux parameters for a reactor device.

In this way, reactor conditions can be brought to a point where nuclear fusion generates net positive energy. In an illustrative example, fuel ions are injected tangentially between an inner electrode and an outer electrode and into an electrostatic field with sufficient energy to assume stable elliptical orbits around the inner electrode. During an elliptical orbit, positively charged fuel ions accelerate towards the negative inner electrode, converting potential energy into kinetic energy, until reaching the perigee point of the elliptical orbit. After reaching perigee, fuel ions decelerate while moving away from the negative cathode potential and storing potential energy until reaching the apogee point of the elliptical orbit. A fuel ion completes millions of such orbits in the reactor over a period of time on the order of one second. Additionally, an ions elliptical orbit can cross those of other ions millions of times, increasing the probability of a relatively unlikely fusion event to occur. Eventually, a fusion event occurs between fuel ions in colliding orbital trajectories, releasing fusion reaction products, including but not limited to charged particles (alphas, helium-3, protons, tritium, etc.), radiation, and thermal energy.

After a fusion event, a portion of the fusion reaction charged particles impact the electrodes, converting kinetic energy into heat that is dissipated into the device. Additionally, unreacted fuel ions eventually impact the negatively charged electrode, further heating the device. Cooling channels in the reactor can extract heat which can be used to generate electricity via thermodynamic cycles (e.g., by Seebeck thermoelectric generator devices or heat-exchanger systems). The remaining fusion reaction product particles assume stable orbits around the negative cathode potential well. Fusion products, travelling faster than fuel ions also orbiting the inner electrode, can transfer kinetic energy to the fuel ions via Rutherford upscattering interactions. After multiple ion-ion scattering collisions, the fusion products collide with reactor internal surfaces, generating additional heat. The upscattered fuel ions follow circular orbits, which increases the effective ion temperature, the reactivity of the fusion plasma, and the overall fusion reaction rate. In this way, the orbital confinement reactor device can sustain nuclear fusion with net-positive energy output that can be used to generate electricity in a compact footprint.

Fusion Reaction Physical Principles:

The following discussion of principles of an orbital confinement reactor device is not intended to limit the scope of the present disclosure. For example, while discussion of fusion reactions will focus on Deuterium-Deuterium fusion, it is contemplated that the principles are equally applicable to other fusion reactions including but not limited to proton-boron 11 fusion and deuterium-tritium fusion.

Furthermore, it is contemplated that fusion reactions may be further augmented by multiple steps, whereby a first fusion reaction serves as a source of fuel ions directly in the device, for example, through neutron activation of Li-6 in an exothermic step that generates energetic alpha particles and tritium. In this way, the fusion of two or more species, including but not limited to neutrons, protons, deuterium, tritium, helium-3, lithium-6, or boron-11, generates fusion products at elevated kinetic energy. Fusion products can collide with fuel ions, transferring kinetic energy through upscattering, thereby promoting fuel ions to temperatures with chain reaction potential. In the context of deuterium-deuterium fusion (D-D), reactions are approximately equally likely to follow either of the following paths:

$$D + D \rightarrow {}_2^3He(0.82 \text{ MeV}) + n(2.45 \text{ MeV}) \quad 50\% \quad (1)$$

$$D + D \rightarrow {}_1^3T(1.01 \text{ MeV}) + p(3.02 \text{ MeV}) \quad 50\% \quad (2)$$

Upscattering between alpha particle fusion products and fuel ions is described by the following collisional upscattering reaction:

$$2\,{}^3He(0.82 \text{ MeV}) + D_{slow} \rightarrow D_{fast} \quad (3)$$

Equation (3) represents collisional up-scattering of deuterons to energies at which the deuterons can induce follow-on reactions of the type in Equation (1).

The chain reaction equation for D-D fusion with a helium-3→deuterium up-scattering path is described as follows, the parameters being defined in table 1:

$$I_D = I_{{}_2^3He} n_D \sigma_{{}_2^3He \rightarrow D} x_{{}_2^3He} \quad (4)$$

The up-scattered deuterium current and energy distribution is determined by Equation (4). The number of fusion events resulting from the up-scattered deuterium current ($I_D$) is defined as follows:

$$I_{D-Dfusion} = n_D I_D \sigma_{D-Df} x_D \quad (5)$$

$$k_{D-Dfusion} = \frac{0.5 I_{D-Dfusion}}{I_{{}_2^3He}} \quad (6)$$

TABLE 1 parameter definitions for equations 4-6

| | |
|---|---|
| $I_{{}_2^3He}$ | Initial helium-3 current e.g. due to thermonuclear reactions (atoms/s) |
| $n_D$ | Deuterium density (atoms/cm³) |
| $\sigma_{{}_2^3He \rightarrow D}$ | Helium-3 -> deuterium Rutherford up-scattering cross section (cm²) |
| $x_{{}_2^3He}$ | Helium3 atom interaction length/stopping distance (cm) |
| $I_D$ | Up-scattered deuterium current (atoms/s) distribution |
| $I_{D-Dfusion}$ | Integrated deuterium-deuterium fusion reaction rate (reactions/s) |
| $\sigma_{D-Df}$ | D-D fusion cross-sections (cm²) |
| $x_D$ | Deuterium interaction length/stopping distance (cm) |
| $k_{D-Dfusion}$ | D-D collisional fusion chain reaction factor |

In some embodiments, an orbital confinement fusion reactor functions with a ratio of fusion reactions over the helium-3 (or alpha particles for alternate fuels) current to the positive electrode above unity (e.g. $k_{D-Dfusion} > 1$). In this way, additional energy output can be achieved, after taking into account collisional and other loss mechanisms such as Bremsstrahlung radiation and/or confinement losses.

While this disclosure focuses on Deuterium-Deuterium fusion in the process description, as an electrostatic ion confinement device the reactor is also capable of operation with any fusion fuel while imposing magnetic fields for electron confinement. Generally, higher fuel ion energy and reaction product energy implicates higher electric field strength for positively charged particle confinement, but it is understood that the physical principles of electron injection and Rutherford upscattering are equally applicable to stimulate additional nuclear fusion in a variety of fuel ion types for both energy generation and neutron production.

Deuterium-Deuterium and Deuterium-Tritium can be used as fusion fuels for high flux neutron production and releases neutrons with a mean energy of 2.45 MeV (50% branch probability). Deuterium-Tritium fuels produce a highly penetrating neutron with a mean energy of 14.1 MeV. Deuterium-Helium3 fusion produces a 4 MeV alpha particle and an energetic proton (14 MeV) that has applications as a high energy proton beam source. Proton-Boron11 fusion produces three alpha particles with an average energy of 2.9 MeV. Such alpha particles may be confined in an orbital confinement reactor, upscatter additional ions to fusion energies and serve to increase fusion yield. Any of the aforementioned fusion fuels may be used for energy generation or as a neutron source for imaging or the generation of valuable isotopes.

In some embodiments, the orbital confinement reactor generates a plasma in which particles are characterized by stopping distances greater than 1E8 cm, and mean generation times (A) on the order of ~1 s. The principles of stopping distance and mean generation time are described in more detail in the following paragraphs.

In the context of the present disclosure, stopping distance describes a distance over which a particle loses energy to interactions with matter, such as through collisions with other particles in a plasma. The stopping distance of ions in a plasma is briefly summarized as follows:

$$S = -\frac{dE}{\rho dx} = \frac{K}{AE}[(Z - Z^*)L_{be} + Z^* L_{fe}] \quad (7)$$

$$K = \frac{2\pi N_a m_a}{m_e}, E = \frac{m_a v_a^2}{2} \quad (8)$$

$$L_{be} = \ln\left(\frac{2m_e v_a^2}{T}\right) \quad (9)$$

$$L_{fe} = G(x)\ln\left(\frac{2m_e v_{ae}^2}{hw_{pe}}\right) \quad (10)$$

where $x = \dfrac{v_a}{\sqrt{\dfrac{2kT_e}{m_e}}}$, $G(x) = \text{erf}(x) - \dfrac{2}{\sqrt{\pi}} x\exp(-x^2)$, $$hw_{pe} = 3.71 \times 10^{-11} \sqrt{n_e(\text{cm}^{-3})} \text{ eV}$$

TABLE 2

Parameter definitions for equations 7-10

| | |
|---|---|
| S | Stopping distance in Mev-cm2/mg |
| $N_a$ | Avogadro number |
| E | Ion kinetic energy where the subscript a is the fast atom, e.g. ma is the proton mass (a = 1) is 1.66e−27 kg, va is the proton velocity (m/s) |
| Z | atomic number of the plasma (proton = 1, alpha particle = 2, etc.) |

TABLE 2-continued

Parameter definitions for equations 7-10

| | |
|---|---|
| Z* | average ionization degree of the plasma medium the ion is travelling through |
| A | element mass number for the plasma medium |
| $m_e$ | subscript e signifies electron, in this case electron mass (me) |
| I | Mean excitation energy 9 eV for proton |
| x | ratio of fast ion velocity (va) to electron thermal velocity |
| $hw_{pe}$ | plasmon energy in eV |
| $v_{ae}$ | the average relative speed between fast ion and plasma electrons |

Stopping distances are strongly influenced by the number of electrons ($n_e$) present in the plasma and the plasma electron temperature ($T_e$), as reflected in the definitions of parameters x, and $hw_{pe}$. The electron temperature is directly proportional to the square of the electron velocity ($V_e$) of the emitted electrons from the emissive coating scaled by the Boltzmann constant $K_b$:

$$T_e = \frac{mV^2}{K_b} \quad (11)$$

Above electron temperatures of 10,000 eV the stopping power is significantly reduced, particularly for ion energies below 500 keV.

As previously described, the orbital confinement device can operate at least in part by accelerating ions through collisional energy transfer. The probability of a particular collision is described by a collisional cross section, as would be understood by a person having ordinary skill in the art. The cross section for up-scattering a deuterium ion from a helium-3 particle is governed by the Rutherford differential scattering equation:

$$\sigma_{^3_2He \to D} = \frac{Z_D^2 Z_{^3_2He}^2 \left(\frac{a\hbar c}{E_{^3_2He}}\right)^2}{16\sin^4(\theta/2)} \cdot 0.01 \text{(barn)} \quad (12)$$

TABLE 3

Definitions of parameters in equation 12

| | |
|---|---|
| a/hc | Stopping distance in Mev-cm2/mg 197.3 MeV fm |
| $\sigma_{^3_2He \to D}$ | differential cross-section (in barns) for scattering a deuteron to an energy level corresponding to a given scatter angle θ |
| $E_{^3_2He}$ | helium 3 particle energy in MeV |
| $Z_{^3_2He}$ | helium3 particle charge (+2) |
| $Z_D$ | up-scattered ion charge (+1 for deuterium) |

Collisional energy is transferred from a helium-3 to a deuterium ion via the full-angle scattering (FAS) method, summarized by the following equations:

The impact parameter is defined as:

$$b_\perp = \frac{|q_i q_j|}{4\pi\varepsilon_o m_{ij} v_{ij}^2} \quad (13)$$

Where q is the charge of the particle, $\varepsilon_o$ the vacuum permittivity, $m_{ij}$ the reduced mass and $v_{ij}=|v_i-v_j|$ is the relative velocity between the two particles. The maximum impact parameter is set to the Debye length as follows:

$$b_{max} = \lambda_D = \sqrt{\frac{\varepsilon_o k_B/q_e^2}{\frac{n_e}{T_e} + \sum_j z_j^2 n_j/T_i}} \quad (14)$$

Where $k_B$ is the Boltzmann constant, $q_e$ the electron charge, $n_e$ and $n_j$ the electron and ion species (j) number density, $T_e$ and $T_i$ the electron and ion species temperature and $z_j$ the ion species charge.

The total Rutherford cross section is defined as:

$$\sigma_R = \pi b_{max}^2 \quad (15)$$

And the number of Rutherford scattering events can be determined by $$N = \sigma_R v_{ij} n_j dt \ln \Lambda \quad (16)$$

Where dt is the timestep and $\ln \Lambda$ is the well-known Coulomb logarithm defined as:

$$\ln \Lambda = \ln \sqrt{(b_{max}^2 + b_\perp^2)/b_\perp^2} \quad (17)$$

The probability of a single Rutherford event is defined as:

$$P_R = \sigma_R v_{ij} n_j dt \quad (18)$$

The collisional operator functions by evaluating a non-dimensional path length, s, defined as:

$$s = 4\pi b_\perp^2 v_{ij} n_j dt \ln \Lambda \quad (19)$$

Based on the differential Rutherford scattering equation and the collisional operator, a significant majority of up-scattering events are small angle (<1 keV) in nature. As a result, upscattering a Deuterium fuel ion to fusion energies involves multiple collisions over a period of time.

The reaction rate of a self-sustaining collisional up-scattering fusion chain reaction follows an exponential scaling law $e^{(k-1)t/\Lambda}$ with chain reaction multiplication factor k≥1, t is the elapsed time and Λ is the mean generation time:

$$e^{(k-1)t/\Lambda} \quad (20)$$

When k<1 the reaction is deemed subcritical and the reaction rate decreases with time. When k>1 the reaction is deemed supercritical and the reaction rate increases with time. When k=1 the reaction is deemed critical and the reaction rate is steady with time. The mean generation time Λ determines how quickly the reaction progresses but not the steady state value once k=1. Mean generation time scales with the stopping distance of the Helium-3 in the plasma.

For Deuterium ions in thermal equilibrium with free electrons in the plasma ($T_i=T_e$), increasing the electron temperature and/or the electron density increases the energy transfer ratio between electrons and ions, until the Deuterium ion velocities starts to match the Helium-3 velocity, above which the energy transfer ratio decreases.

Operation of an Orbital Confinement Reactor:

In contrast to thermonuclear fusion, orbital confinement reactors confine ions in orbits at defined energies with non-Maxwellian energy distributions. As such, the fusion reaction rate (referred to as "dn/dt") in units of reactions per second is governed by recirculating beam fusion physics, described by the following expression:

$$\frac{dn}{dt} = \sigma \frac{N^2}{S} f_{recirculation} \quad (21)$$

Where $\sigma$ is the Deuterium beam cross-section at a given energy level, S is the interaction area, $f_{recirculation}$ is the recirculation frequency and N is the number of fuel ions in the reactor. For a cylindrical Kingdon/Orbitrap type configuration the key parameters are $r_i$, the inner cathode stalk radius and $r_o$ the outer anode inner surface radius and finally 1, the length of the reactor. The interaction area (S) and recirculation frequency ($f_{recirculation}$) are defined as:

$$S = (r_o - r_i)l \quad (22)$$

$$f_{recirculation} = \frac{v_i}{2\pi(0.5r_o + 0.5r_i)} \quad (23)$$

Where $v_i$ is the Deuterium ion velocity at a given energy. The total space charge in the reactor is a fixed limit. Consequently, as the number of confined fusion reaction charged particles such as Helium-3 increase, the number of total fuel ions decreases to compensate and maintain the space charge limit. In some embodiments, fuel ion concentration is controlled through a fuel ion flux into the reactor. The number of Deuterium ions that can participate in fusion reactions is defined as:

$$N = N_{ion} - N_{Helium3} \quad (24)$$

$$N_{ion} = Vn_i \quad (25)$$

$$N_{Helium3} = 0.5 \, Z_{Helium3} \frac{dn}{dt} \Lambda \quad (26)$$

Where $N_{ion}$ is the space charge limited number of ions in the reactor obtained from the reactor volume (V) and the limit ion number density $n_i$. The number of helium ions present in the reactor is defined as $N_{Helium3}$ where dn/dt is the reaction rate, the 0.5 represents the DD fusion 50% reaction probably for Helium-3, $Z_{Helium3}$ the +2 charge and the mean generation time of ~1 s.

The Helium-3 reaction products can transfer kinetic energy to Deuterium fuel ions, thereby increasing the fusion cross-section, representing reaction probability. This is offset by the fact that as the number of Helium-3 ions in the reactor goes up, the total number of Deuterium ions must decrease to maintain space charge limits. Within the context of a chain reaction, the k-factor in Equation (20) can be evaluated based on the gradients of both the fusion reactivity and the total number of fuel ions as follows:

$$k = \frac{\sigma_2 N_2^2}{\sigma_1 N_1^2} \quad (27)$$

where the numerator $\sigma_2 N_2^2$ describes the fusion cross-section and total fuel ions after a given time interval with Helium-3 upscattering. Initially, during reactor start-up, the number of fusion reactions and Helium-3 ions are low as are reductions in N. Conversely the gradient in fusion cross section is high as the Deuterium ions gain energy and reactivity increases. Depending on the initial ion density, the k-factor can start-off as a large value and as the fuel ions gain energy the reaction rate increases. Eventually, as the number of Helium-3 increase during operation, steady state conditions (k=1) will be reached when increases in fusion cross-section are offset by the reduction in available fuel ions. The steady state condition in the reactor is a complex function of the fusion fuel reactivity as ion energy increases due to up-scattering, ion fuel flux into the device and multiple loss mechanism that transfer energy out of the plasma and cause the ions to lose energy (down scattering, wall impacts, center electrode impacts, radiation, etc.). At k-factors approximately equal to one ("critical" operation) the reaction rate and power output substantially stable with time. Stable operation can be maintained by adjusting reactor operation such that if the reactor output drops below the target power, operating parameters are reset to provide a k-factor above one ("supercritical" operation), whereas if the reactor exceeds the target power, operating parameters are reset to provide a k-factor below one ("sub-critical" operation).

With regard to electron injection, it is understood that the magnetic field can bend the emitted electrodes back toward the cathode, thereby avoiding an arc between the electrodes, if the magnetic field strength exceeds the Hull cut-off condition. For a given voltage, the magnetic field strength that satisfies the Hull cut-off condition is defined by the following expression:

$$B_c = \frac{mc}{ed^*} \sqrt{\frac{2 \, eV}{mc^2} + \left(\frac{eV}{mc^2}\right)^2} \quad (28)$$

where $B_c$ is the critical magnetic field, m the mass of the electron, e the electron charge (absolute value), V the voltage applied across the gap, c the speed of light and d* the geometric factor defined as:

$$d^* = \frac{r_o^2 - r_i^2}{2r_o} \quad (29)$$

With regard to direct energy extraction from harmonic axial motion of ions, scattering events between confined fusion reaction products and fuel ions impart axial kinetic energy and harmonic axial motion of the ions in the reactor. The frequency of the axial motion is characteristic of the charge-to-mass (Z/m) ratio of an ion. Radio-Frequency (RF) energy can be applied at specific frequencies to the outer electrodes to selectively extract axial motion energy via charge image current, in the reverse process by which mass sensors detect mass-specific RF signals generated by the harmonic axial motion of ions.

Application of out-of-phase RF signals to the outer electrodes permits the harmonic axial motion of the ions to be de-excited. As collisions between fusion products and fuel ions occur some of the collision energy is transferred to axial motion. RF applied to the outer electrodes can be used to selectively extract energy from the fuel ions, reaction products or both as they oscillate axially between the two halves of the outer electrode. The AC charge image signal can also be rectified to DC current, to charge energy storage devices such as batteries or to power an electrical load.

The frequency of the axial oscillation is characteristic of the ion mass-to-charge ratio and is determined from the following equation:

$$\omega = \sqrt{\frac{kq}{m}} \quad (30)$$

where ω is the frequency in radians per second, q is the charge of the ion and m is the mass of the ion. The image current signal (I), induced by the axial ion motion, is determined by the following expression:

$$I(t, r) \approx -qN\omega \frac{\Delta z}{\lambda(r)} \sin(\omega t) \quad (31)$$

where N is the number of ions, $\Delta z$ is the magnitude of the axial motion and $\lambda(r)$ depends on the geometry of the trap ($\lambda(r) \approx$ outer radius) and is a function of the trap radius.

Discussion of Orbital Confinement Reactor Systems:

Embodiments of a system and method for generating energy and/or radioisotopes using orbital confinement fusion reactions are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a schematic diagram illustrating an example system 100 for generating energy using an orbital confinement reactor device 105, in accordance with some embodiments of the present disclosure. Example system 100 includes multiple reactor devices 105 provided with fuel ions by fuel ion source(s) 110 and power by power source(s) 115, thermally coupled with thermal generator(s) 120, and electrically coupled with electric generator(s) 125, each connected to a distribution system 130. It is understood that while example system 100 describes a multi-reactor system, applications are contemplated using a single orbital confinement reactor device 105, for example, for portable and/or mobile power generation systems. As described in the preceding sections, example system 100 can be applied to generate isotopes, heat, and/or electricity as carbon-free power, to power large civilian eVTOL and electric aircraft, to power military eVTOL, to generate shipborne power and electric propulsion for vessels sized from small boats to large ships.

Fuel ion source(s) 110 can be or include different types of ion sources capable of generating the fuel ion and supplying it to the example system 100 at energies for orbital capture and subsequent fusion. Example system 100 can also be used, as nonlimiting examples, for portable power generation, robotic chassis and/or exoskeleton power generation, mobile power generation, auxiliary Power Unit (APU) power generation, distributed power generation in remote locations, and/or telecom communication tower power in remote locations. Example system 100 can also be used, as nonlimiting examples, in range extension for electric vehicles, small eVTOL and electric air vehicles, local or regional power grids, grid-connected storage, remote and forward operating base power generation, containerized mobile power generation, and datacenter backup power generation. As such, example system 100 can fill a role ranging from base load generator to peaking generator, depending on the type of system into which it is integrated.

Example system 100 may initiate and/or maintain nuclear fusion and may augment fusion via the collisional upscattering mechanisms described previously. Initiating self-sustaining fusion reactions may include a period of sub-critical (e.g., k<1) operation where one or more orbital confinement reactor devices 105 draw energy from power source(s) 115. In some embodiments, each orbital confinement reactor device 105 is electronically coupled with power source(s) 115. In some embodiments, a subset of orbital confinement reactor devices 105 are electronically coupled with power source(s) 115, and startup can include a cascaded or staggered approach. To that end, example system 100 can include power electronics and interconnection systems such that a first orbital confinement reactor device 105-1 is electrically coupled with power source(s) 115, from which power is drawn during startup. As first orbital confinement reactor device 105-1 reaches criticality (k=1) and produces net positive energy, one or more orbital confinement reactor devices 105 of example system 100 that are electrically coupled to first orbital confinement reactor device 105-1 can draw power to initiate startup. In this way, power drawn from external sources can be reduced, facilitating deployment of example system 100 in areas without established generating capacity. That being said, in applications where response time is important, each orbital confinement reactor device 105 can be individually connected to power source(s) 115 and can each incorporate control systems to startup in parallel or substantially at the same time.

Fuel ion source(s) 110 can include one or more types of ion sources, depending at least in part of the application of example system 100. As described in more detail in the preceding sections, example system 100 can be applied to isotope generation, power generation, and/or heat generation, among other foreseeable uses. In this way, fuel ion source(s) 110 can be or include, but are not limited to, sources of protons, deuterium, tritium, helium-3, lithium-6, or boron-11. As each orbital confinement reactor device 105 operates using a source of fuel ions that are injected into the fusion plasma during operation, example system 100 includes each orbital confinement reactor device 105 operatively coupled with fuel ion source(s) 110. Methods of generating ions include, but are not limited to, electromagnetic ionization of an ion source, nuclear reactions such as neutron capture, thermionic emission, field-effect emission, or the like, as would be understood by a person having ordinary skill in the art.

Figure 2A:
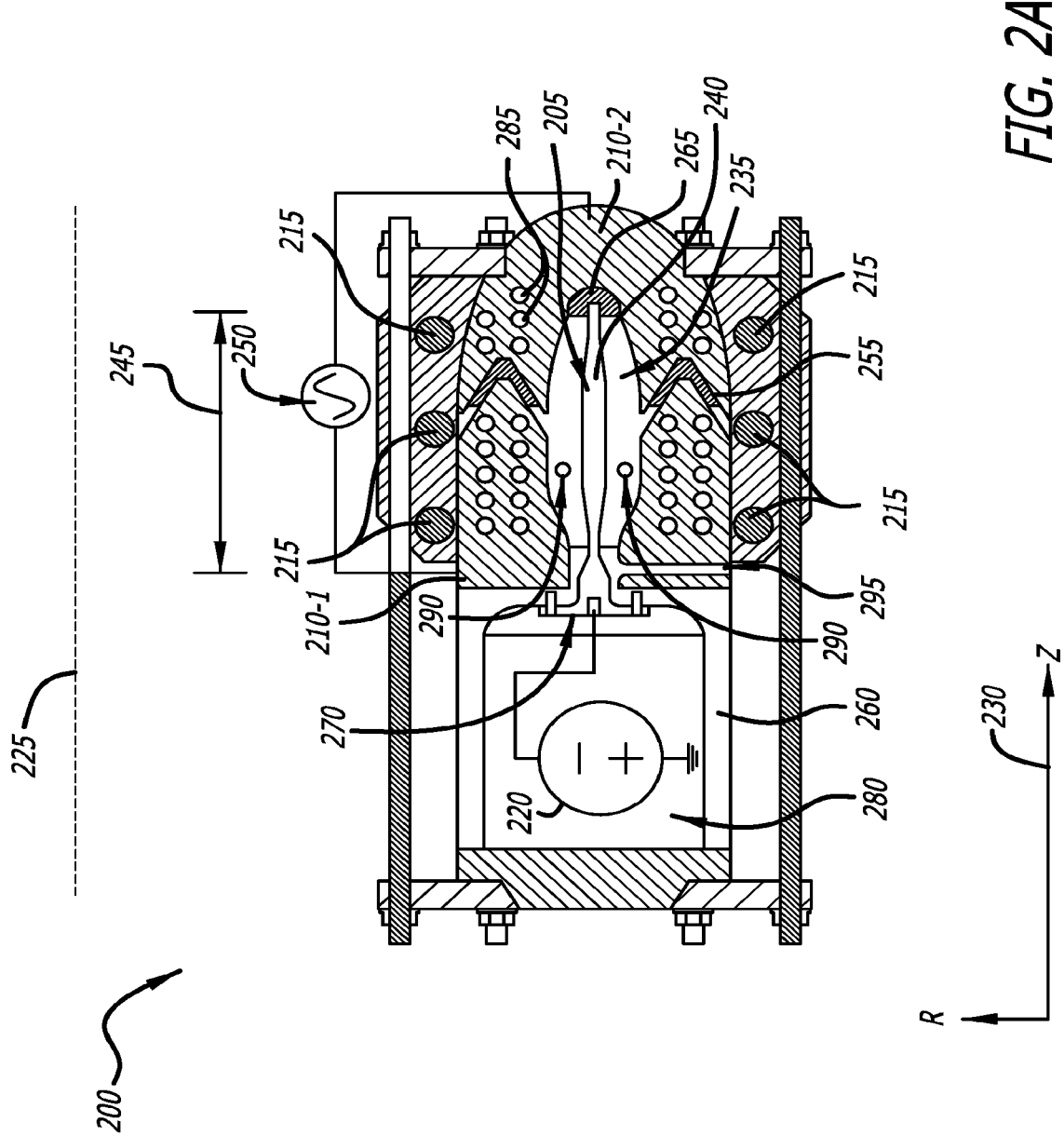
FIG. 2A is a schematic diagram illustrating an example reactor device incorporating a two-part outer electrode, in accordance with some embodiments.
Figure 2B:
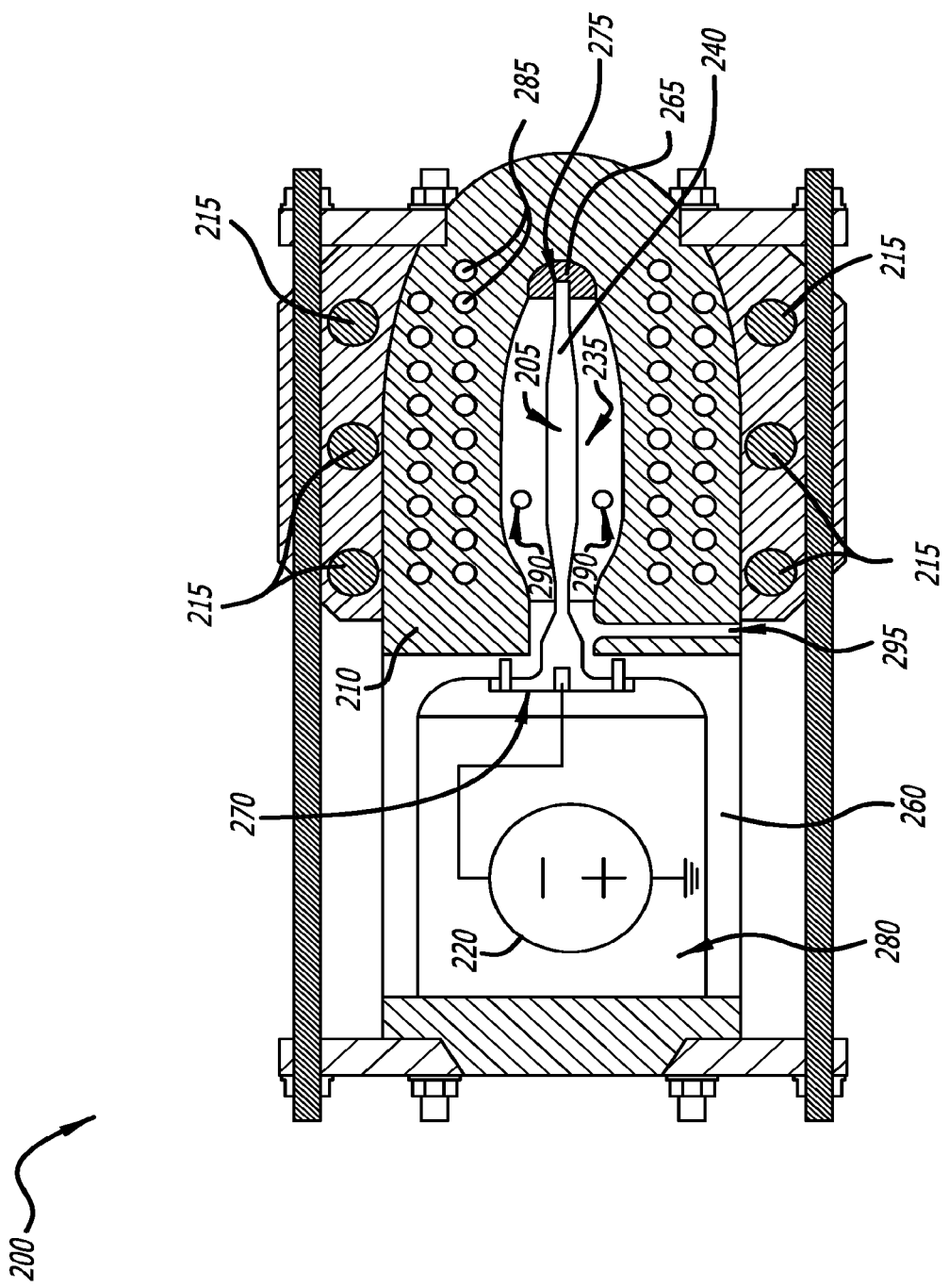
FIG. 2B is a schematic diagram illustrating the example reactor device incorporating a one-part outer anode, in accordance with some embodiments.
Figure 2C:
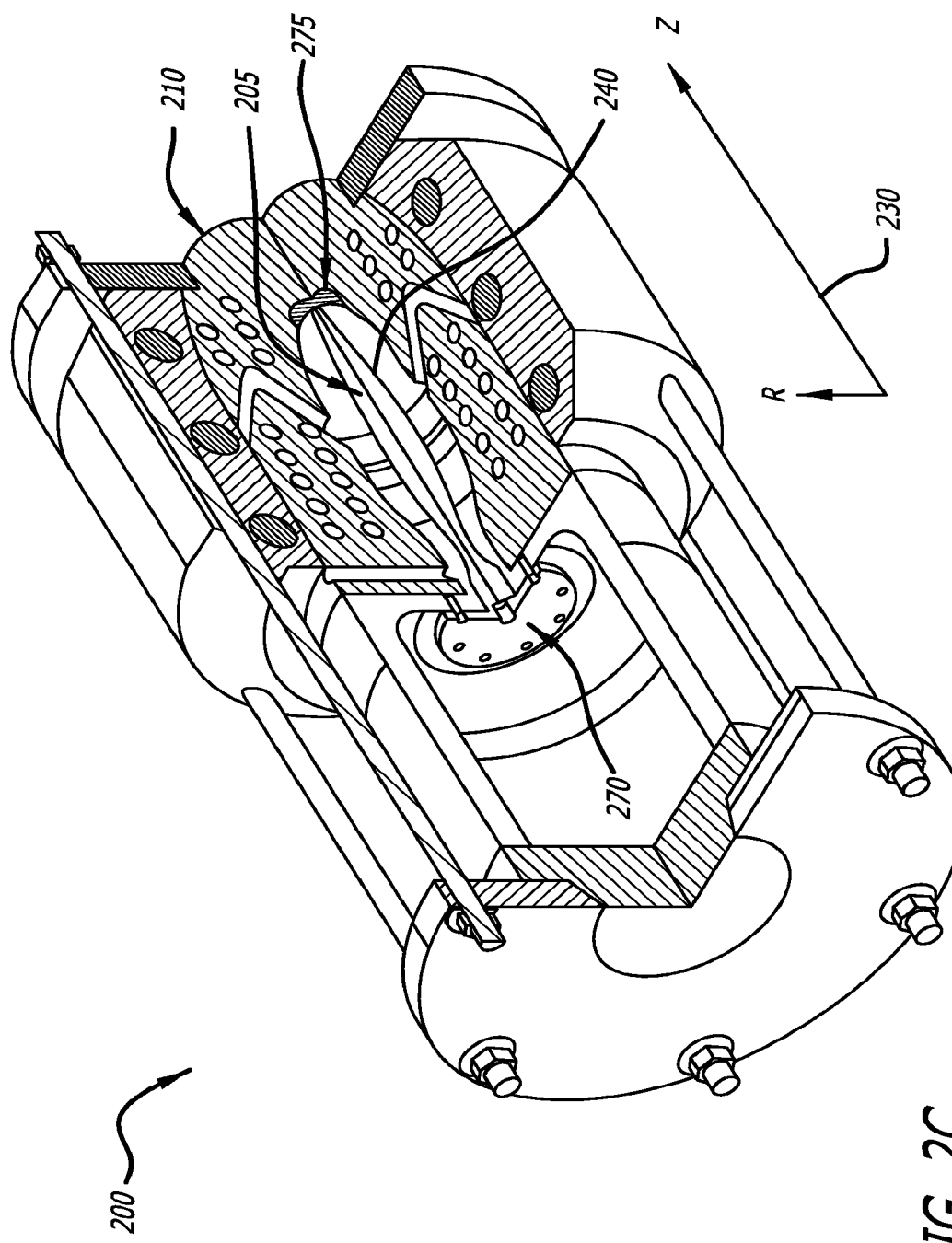
FIG. 2C is a schematic diagram illustrating example reactor device incorporating a two-part outer anode in three-quarter section, in accordance with some embodiments.
Figure 3:
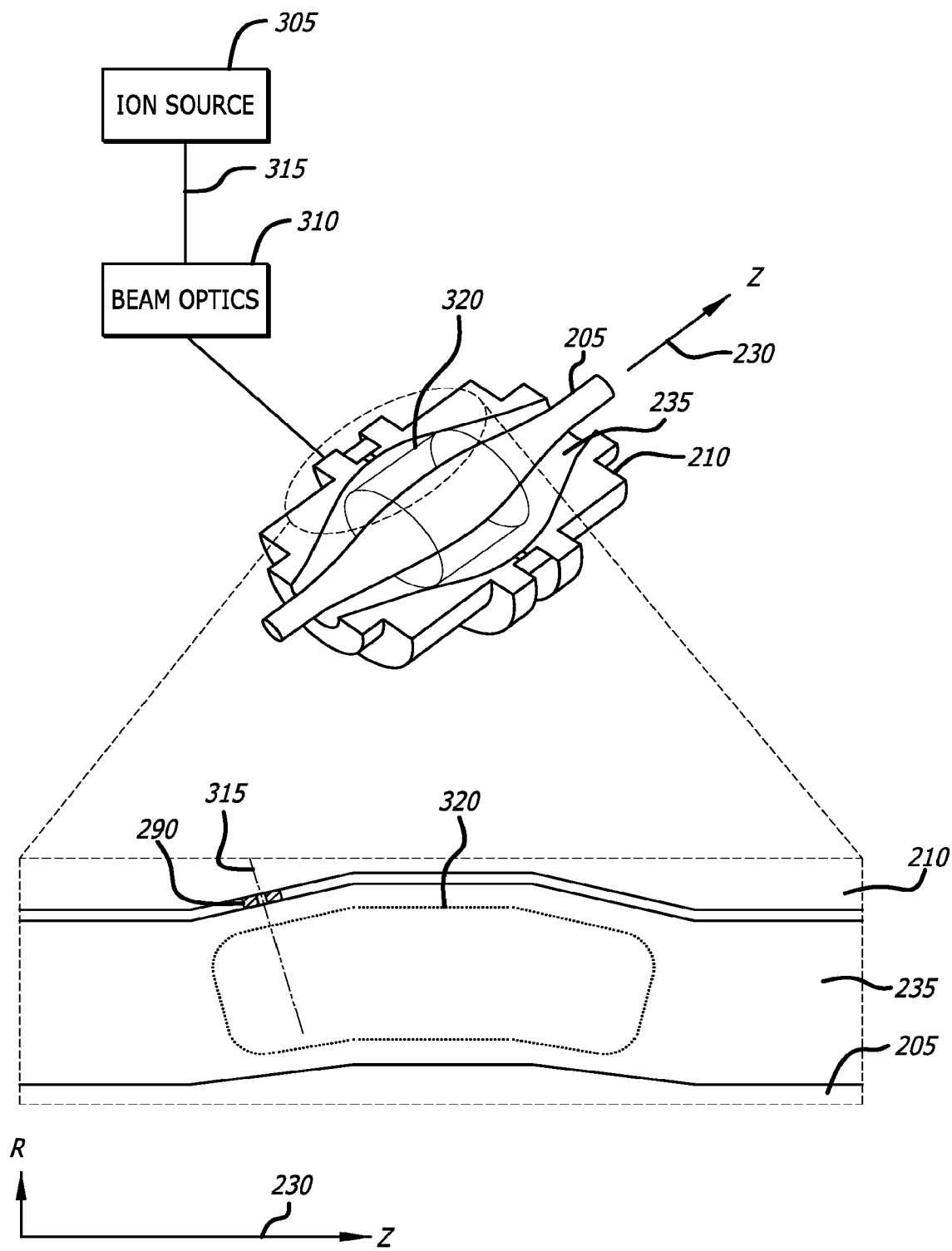
FIG. 3 is a schematic diagram illustrating an example ion injection system, in accordance with some embodiments.
Figure 4:
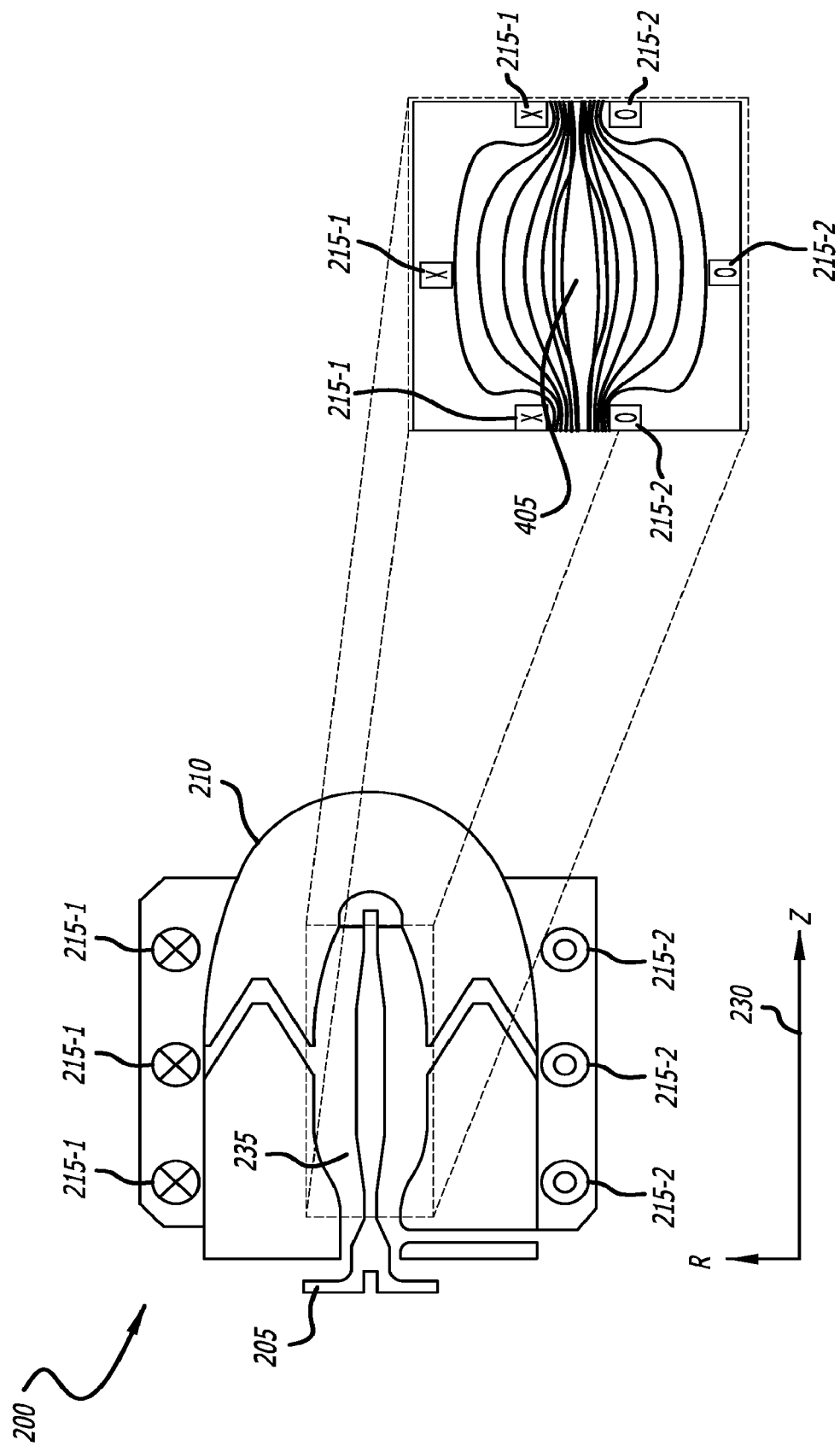
FIG. 4 is a schematic diagram illustrating the example reactor device and magnetic field generator configuration, in accordance with some embodiments.

As described in more detail in reference to FIGS. 2-4, each orbital confinement reactor device 105 in example system 100 can maintain a critical fusion reaction (e.g., k≈1) and can extract energy from the fusion plasma. The energy can be extracted as thermal energy resulting from ion and electron impact into internal surfaces exposed to plasmas.

Such thermal energy can be transferred by fluidly coupling orbital confinement reactor device(s) 105 with a heat exchange system and applying one or more techniques for harvesting electrical energy from heat thus harvested. For example, where reactor operating temperatures can be maintained on the order of 1000 K, a coolant can be circulated through one or more components of orbital confinement reactor device(s) 105, using heat to generate work. In this way, thermal generators 120 can be or include systems including, but not limited to, compressors, turbines, turbomachinery, and/or thermoelectric generators, as well as liquid heat transfer systems for conducting heat from orbital confinement reactor device(s) 105 to thermal generator(s) 120. Additionally and/or alternatively, thermal generator(s) 120 can also include heating systems that use at least a portion of the thermal energy as a heat source.

In some embodiments, example system 100 includes electric generator(s) 125 to directly capture electrical energy from orbital confinement reactor device(s) 105. As described in the preceding sections, collisional energy transfer in a recirculating ion plasma induces axial harmonic motion of ions orthogonal to the applied electric field between the electrodes. The frequency of the axial motion can be in the radio frequency (RF) range and can be characteristic of the mass-to-charge ratio of the ions. As such, orbital confinement reactor device(s) 105 can each extract electricity by actively damping axial harmonic motion of ions, and the power thus generated can be converted into useful electricity by power electronics included as part of electric generators 125. In some embodiments, electric generators 125 include one or more component systems to output direct current and/or alternating current electricity from the RF power drawn from orbital confinement reactor device(s) 105. For example, electric generators 125 can include RF-to-DC rectifier systems, such that example system 100 can be used to store electricity in grid storage using multi-cell batteries, liquid metal batteries, or the like.

Additionally and/or alternatively, example system 100 operates to generate neutrons for one or more purposes through selection of fuel ion source(s) 110 and/or operating parameters. In this way, example system 100 can be operably coupled with systems for using neutrons in applications including, but not limited to, formation of radioisotopes, production of hydrogen, treatment of nuclear waste, manufacture of tritium by neutron bombardment of lithium, breeding of nuclear fission fuel, materials analysis including neutron spectroscopy and/or neutron imaging and/or neutron activation analysis, materials processing by neutron irradiation, detection of materials, medical imaging, medical therapy including neutron capture therapy and/or neutron beam therapy testing of materials and components, or other uses in scientific research, as would be understood by a person having ordinary skill in the art.

In some embodiments, example system 100 includes one or more groups of orbital confinement reactor devices 105 applied to one of a number of uses. For example, one or more orbital confinement reactor devices 105 can be used to generate heat, one or more orbital confinement reactor devices 105 can be used to generate electricity, and one or more orbital confinement reactor devices 105 can be used to generate neutrons. In some embodiments, a single orbital confinement reactor device 105 can be used to generate heat and electricity, heat and neutrons, or combinations thereof. Such versatility in application is facilitated by selection of operating parameters, fuel ion source(s) and internal structures of orbital confinement reactor device(s) 105, described in reference to FIGS. 2A-6, below.

FIGS. 2A-2C illustrate an example reactor device 200 including internal structures for generating and sustaining nuclear fusion and for extracting energy, as described in reference to FIG. 1, FIG. 2A, and FIG. 2B describe example reactor device 200 in section and focus on different internal structures to simplify description and clarify the visual illustration. It is understood, however, the example reactor device 200 includes the structures described in FIG. 2A, FIG. 2B, and/or FIG. 2C, except where inclusion is physically impossible.

FIG. 2A is a schematic diagram illustrating example reactor device 200 incorporating a two-part outer electrode 210, in accordance with some embodiments. Example reactor device 200 is an example of orbital confinement reactor device(s) 105 of FIG. 2, configured to be able to withdraw electrical energy by damping harmonic axial motion of ions in the fusion plasma. The example reactor device 200 includes a cathodic inner electrode (205), an anodic outer electrode (210), magnetic field generator(s) (215), a high voltage power source (220), and a radiation shield (225).

Example reactor device 200 is configured to generate energy using a fusion plasma generated between inner electrode 205 and outer electrode 210. To that end, inner electrode 205 defines a longitudinal axis 230 of example reactor device 200. Outer electrode 210, in turn, is disposed concentric with longitudinal axis 230 with an inner diameter greater than an outer diameter of inner electrode 205, defining an offset between inner electrode 205 and outer electrode 210. In this way, the electrode arrangement defines a chamber 235 between inner electrode 205 and outer electrode 210. During operation, a fusion plasma is generated in chamber 230 and maintained at or near criticality through combined application of electric and magnetic fields.

In some embodiments, inner electrode 205 is electrically coupled with high voltage power source 220 and is configured to create an electrostatic field between inner electrode 205 and outer electrode 210. Inner electrode 205 can be or include an emitter material 240 such that inner electrode 205 acts as a source of free electrons. Emitter material 240 can be disposed as an emissive coating on a conductive core. In this way, emitter material 240 is configured to inject electrons into the chamber 235 when inner electrode 205 is energized and/or heated. Emitter material 240 can be or include a refractory material characterized by thermionic emission properties at temperatures characteristic of fusion reactions. Emitter material 240 can be characterized by high electron emission properties either via photoemission, thermionic emission, or field emission. Emitter material 240 can be or include tungsten, thoriated-tungsten, barium-oxides (e.g. Ba—O), Lanthanum hexaboride ($LaB_6$), Cerium hexaboride ($CeB_6$), as well as blends, alloys, composites, or combinations thereof. In the context of example reactor 200, photoemission refers to a material that emits electrons into chamber 235 in response to irradiation by energetic photons, such as photons generated by a fusion plasma.

Emitter material 240 is configured to emit electrons approximately normal to the longitudinal axis 230, due at least in part to orientation of inner electrode 205 relative to outer electrode 210. As such, inner electrode 205 is oriented to minimize stopping power losses due to collisions with orbiting ions, as described in more detail in reference to FIG. 5. Advantageously, injecting electrons normally from the inner electrode 205 and curving electron trajectories in the same direction of orbiting ions via the Lorentz force created by magnetic field generators 215 can increase interaction lengths between electrons and ions to distances on the order of 1×10⁸ cm and may increase the probability of a fusion reaction (e.g., as described by cross sections for a particular interaction and/or reaction). Advantageously, injecting electrons in this way reduces space-charge effects and allows the fusion plasma to become denser than with electrostatic ion confinement alone.

For example, at elevated temperatures greater than approximately 1000 K, emitter material 240 emits electrons into chamber 235, reducing space-charge effects and densifying the plasma beyond the density provided by electrostatic ion confinement. Inner electrode 205 can be operably coupled with one or more heating systems to raise the temperature of emitter material 240. Elevated temperature can be produced by several methods and systems, including but not limited to, resistive heating, induction heating, and or through electron and ion bombardment during operation. It is understood that emitter material 240 can generate a significant electron current at temperatures below 1000 K, such as at operating temperatures of example reactor device 200.

As described previously, ion density and hence power available from example reactor device 200 is governed by the number of ions orbiting inner electrode 205 (N). The number of ions can be increased by emitting electrons from inner electrode 205 to offset space charge limits. The electrons can be confined in the reactor for periods of time through application of an axial magnetic field meeting or exceeding the Hull cut-off condition and operating like a Magnetron for electron confinement. While confined, electrons travel at velocities that reduce electron drag and stopping power on the fuel and reaction product ions, thus reducing ion kinetic energy loss to electrons and increasing fusion reaction rate and power in the reactor.

Magnetic field generator(s) 215 can be disposed in a coaxial arrangement relative to the longitudinal axis 230. In this way, magnetic field generator(s) 215 are configured to form a magnetic field substantially parallel to the longitudinal axis 230 in the chamber 235. Magnetic field generator(s) 215 can be or include electromagnets, permanent magnets, or a combination thereof. Magnetic field generator(s) 215 can apply a magnetic field at a strength ranging from 0.01 Tesla to 10 Tesla. Magnetic field generator(s) 215 can thus serve as a magnetron, generating a magnetic field at strength exceeding the Hull cut-off condition for a given fusion reaction. As previously described, the field strength, and thus the operating parameters of magnetic field generator(s) 215, used to exceed the Hull cut-off condition is specific to each type of fusion reaction. In addition, magnetic field strength may be used as a control variable to adjust the k-factor of example reactor device 200 when in operation, as described in more detail in reference to FIG. 4.

In some embodiments, inner electrode 205 and outer electrode 210 are solids of revolution and shaped to be symmetric about longitudinal axis 230. In this context, a "solid of revolution" describes a shape that is symmetrical about one or more axes of revolution, for example, as defined by a two-dimensional shape that is symmetrical about an axis in a plane transecting the axis. In some embodiments, electrodes 205 and 210 are solids of revolution that incorporate apertures, orifices, conduits, or other features that are not rotationally symmetric about longitudinal axis 230, as described in more detail below.

In this way, electrodes 205 and 210 are shaped to form a substantially logarithmic electrostatic field in the chamber when energized. A logarithmic electrostatic field, as previously described, refers to an electric field generated between electrodes 205-210, with inner electrode 205 serving as the negative cathode and outer electrode 210 service as the positive anode, where the strength of the electric field increases logarithmically between outer electrode 210 and inner electrode 205, referring to the positive-to-negative convention for electric fields.

In some embodiments, inner electrode 205 is characterized by an aspect ratio greater than one along longitudinal axis 230. In this context, the term "aspect ratio" describes a ratio of a first characteristic dimension aligned with longitudinal axis 230 and a second characteristic dimension aligned normal to longitudinal axis 230. For example, where inner electrode 205 is a solid of revolution that is characterized by a radial dimension that depends on axial position (e.g., r=f(z)), the aspect ratio greater than one describes a structure where the length of inner electrode 205 is greater than the widest point of inner electrode 205. As such, inner electrode 205 may define an axial profile, along longitudinal axis 230, that includes one or more regions of greater width and one or more regions of narrower width. For example, inner electrode 205 may define a lateral profile aligned with longitudinal axis 230 the includes a taper at each end, such that the width of inner electrode 205 is wider between the ends than at the ends.

In some embodiments, outer electrode 210 has a length 245 along longitudinal axis 230 greater than the largest diameter of inner electrode 205. For example, outer electrode 210 can be a solid of revolution about longitudinal axis 230 and can define a negative space about longitudinal axis 230 that, together with inner electrode 205, defines chamber 235. In the example, outer electrode 210 does not contact inner electrode 205 along length 245, as illustrated in FIGS. 2A-3.

Outer electrode 210 can include one, two, or more shells that can be used to excite or damp harmonic axial motion of ions parallel to longitudinal axis 230. In some embodiments, outer electrode includes two anode shells 210-1 and 210-2, disposed laterally relative to longitudinal axis 230. As described previously, anode shells 210-1 and 210-2 can be solids of revolution, symmetrical about longitudinal axis 230, In this context, the phrase "disposed laterally" refers to anode shells 210-1 and 210-2 being disposed in example reactor device 200 at different and/or non-overlapping positions along longitudinal axis 230. In some embodiments, anode shells 210-1 and 210-2 are connected by an image current circuit 250. In some embodiments, a dielectric insulator 255 is disposed between and electrically isolates the anode shells 210-1 and 210-2.

In some embodiments, inner electrode 205 and outer electrode 210 are electrically isolated from each other by a first dielectric insulator 260 and a second dielectric insulator 265. First dielectric insulator 260 can be mechanically coupled with a first end 270 of inner electrode 205 and can electrically isolate high voltage power source 220 from outer electrode 210. Second dielectric insulator 265 can be disposed in chamber 235 between a second end 275 of inner electrode 205 and outer electrode 210 and can electrically isolate the second end 275 from outer electrode 210. First dielectric insulator 260 can define an insulated cavity 280. High voltage power source 220 can be disposed at least partially within insulated cavity 280.

High voltage power source 220 can be or include a direct current voltage source, including but not limited to a Van de Graaff source, a Pelletron source, or a solid-state power switching generator. In some embodiments, high voltage power source 220 is electrically coupled with inner electrode 205 and is operative in a range from about 50 kV DC to about 4.0 MV DC. As inner electrode 205 functions both as a source of electrons to be injected into cavity 235 and as a source of electrostatic field serving to trap ions into orbit around inner electrode 205, voltage applied to inner electrode 205 by high voltage power source 220 can be dynamic during one or more stages of operation of example reactor device 200. For example, electron flux and force applied to orbiting ions can scale proportionally with applied voltage. As such, applied voltage can be a control parameter for example reactor device 200. Furthermore, applied voltage can vary based at least in part on the type of ions injected into chamber 235. As previously described, force applied to ions in orbit about inner electrode 205 is a function of charge-to-mass ratio, such that applied voltage may vary with fuel ion mass, fuel ion charge, or a combination thereof.

In this way, high voltage power source 220 can be operative from about 50 kV DC to about 4.0 MV DC, about 50 kV DC to about 3.9 MV DC, about 50 kV DC to about 3.8 MV DC, about 50 kV DC to about 3.7 MV DC, about 50 kV DC to about 3.6 MV DC, about 50 kV DC to about 3.5 MV DC, about 50 kV DC to about 3.4 MV DC, about 50 kV DC to about 3.3 MV DC, about 50 kV DC to about 3.2 MV DC, about 50 kV DC to about 3.1 MV DC, about 50 kV DC to about 3.0 MV DC, about 50 kV DC to about 2.9 MV DC, about 50 kV DC to about 2.8 MV DC, about 50 kV DC to about 2.7 MV DC, about 50 kV DC to about 2.6 MV DC, about 50 kV DC to about 2.5 MV DC, about 50 kV DC to about 2.4 MV DC, about 50 kV DC to about 2.3 MV DC, about 50 kV DC to about 2.1 MV DC, about 50 kV DC to about 2.1 MV DC, about 50 kV DC to about 2.0 MV DC, about 50 kV DC to about 1.9 MV DC, about 50 kV DC to about 1.8 MV DC, about 50 kV DC to about 1.7 MV DC, about 50 kV DC to about 1.6 MV DC, about 50 kV DC to about 1.5 MV DC, about 50 kV DC to about 1.4 MV DC, about 50 kV DC to about 1.3 MV DC, about 50 kV DC to about 1.2 MV DC, about 50 kV DC to about 1.1 MV DC, about 50 kV DC to about 1.0 MV DC, about 50 kV DC to about 0.9 MV DC, about 50 kV DC to about 0.8 MV DC, about 50 kV DC to about 0.7 MV DC, about 50 kV DC to about 0.6 MV DC, about 50 kV DC to about 0.5 MV DC, about 50 kV DC to about 0.4 MV DC, about 50 kV DC to about 0.3 MV DC, or about 50 kV DC to about 0.2 MV DC, including fractions or interpolations thereof. For example, in some embodiments, high voltage power source 220 applies a negative voltage of about 650 kV DC to inner electrode 205. In this context, the term "about" is used to indicate a value within 10% of the stated value. For example, a stated value of about 650 kV is used to indicate a value from 585 kV DC to 715 kV DC. It is understood that the values are given as magnitudes without reference to polarity. For example, inner electrode 205 can be biased negatively relative to outer electrode 210, such that the applied voltage supplied by high voltage power source 220 to inner electrode 205 is negative.

Radiation shield 225 can be or include structural elements of example reactor device 200, or additional material, including but not limited to lead or tungsten shielding, water pools, or the like. Example reactor 200 may be at least partially surrounded by radiation shield 225, such that radiation shield 225 can be used to absorb and lower potentially harmful radiation. While nuclear fusion produces few to no long-lived radioactive byproducts, energetic particles may be produced and may transit the physical enclosure of example reactor device 200. As such, radiation shield 225 may be or include materials selected to absorb foreseeable energetic particles, based at least in part on the mode of operation of example reactor device 200. For example, where example reactor device 200 is configured to generate radioisotopes for medical use, radiation shield 225 can be structured to absorb energetic neutrons.

FIG. 2B is a schematic diagram illustrating example reactor device 200 incorporating a one-part outer anode 205, in accordance with some embodiments. As illustrated in FIG. 2A, example reactor device includes inner electrode 205, outer electrode 210, magnetic field generators 215, high voltage power source 220, and radiation shield 225. In FIG. 2B, example reactor device 200 is illustrated including fluid conduit(s) 285, aperture(s) 290, and port(s) 295. While discussion of example reactor device 200 focused on a configuration including a two-part outer electrode 210, example reactor device 200 can also include a one-part outer electrode 210, as illustrated in FIG. 2B. It is contemplated that fluid conduit(s) 285, aperture(s) 290, and/or port(s) 295 can be included in either configuration, as well as other electrode configurations with more parts.

Fluid conduit(s) 285 can be integrated into inner electrode 205, outer electrode 210, radiation shield 225, or a combination thereof. As shown, fluid conduit(s) 285 define one or more channels within outer electrode 210. In this way, fluid conduit(s) 285 can define one or more coolant loops through outer electrode 210, through which a coolant can flow. The coolant, in turn, can carry heat out of example reactor device 200, and can transfer the heat into a working fluid, via a heat exchanger external to example reactor device 200, to drive thermal generator(s) 120 of FIG. 1. Similarly, fluid conduit(s) can be coupled, directly or via a heat exchanger, with thermoelectric generators, turbines, and/or turbomachinery, such that heat generated internal to example reactor device 200 can be removed. Advantageously, fluid conduit(s) 285 can both extract usable energy from example reactor device 200 and can also serve to control operating parameters. In an illustrative example, fluid conduit(s) 285 disposed internal to inner electrode 205 can be used to modulate thermionic emission from emitter material 240, as heat removal from inner electrode 205 modulates temperature, which, in turn, affects thermionic emission.

Coolant can be or include a flowable liquid that exhibits phase transition to gas at temperatures above the operating temperature of example reactor device 200 and phase transition to solid at temperatures below the operating temperature of example reactor device 200. For example, where the operating temperature of a fusion plasma in chamber 235 can be about 1000 K, fluid conduit(s) 285 can be configured to receive a coolant including but not limited to molten salt, high pressure water, supercritical carbon dioxide, or other coolant systems as described in reference to FIG. 1.

Aperture(s) 290 can be defined at one or more points in the outer electrode 210, such that example reactor device can be operably coupled with an ion source, as described in more detail in reference to FIG. 3. Aperture(s) 290 can be substantially linear and can be coupled to an ion source via a vacuum-tight mechanical coupling, for example, with a shutter, gate valve, and/or one or more differential vacuum stages interposed between the ion source and chamber 235, such that ions can be controllably injected into chamber 235 at a precise injection trajectory. To that end, aperture(s) 290 can define an alignment relative to longitudinal axis 230 that defines the injection trajectory. The injection trajectory, in turn, can correspond to a pitch angle of entry of a stable elliptical orbit of an ion of a given mass-to-charge ratio about the inner electrode 205. In this context, the term "pitch angle of entry" describes the angle taken by a positively charged ion in three dimensions along the alignment of aperture 290, relative to longitudinal axis 230, where the angle corresponds to a trajectory likely resulting in trapping the ion in an elliptical orbit about inner electrode 205. As described previously, the injection point, kinetic energy, and pitch angle of entry can each depend on the mass-to-charge ratio of fuel ions, such that injection parameters can be precisely determined based on a target application using computer simulation. In an illustrative example, ions can include protons (m/z=1), deuterium ions (m/z=2), tritium ions (m/z=3), lithium-6 ions (m/z=6), or boron-11 ions (m/z=11).

Outer electrode 210 further defines port(s) 295 that extend through outer electrode 210 and into chamber 235. Port(s) 295 can be fluidly coupled with a vacuum system external to example reactor device 200, which can be used to create and maintain a vacuum environment between inner electrode 205 and outer electrode 210. A substantial vacuum condition can be created through the one or more port(s) 295, for example, at number densities from $1 \times 10^{10}$ to $1 \times 10^{16}$ atoms/cm3 (corresponding to approximately 50 micro-Pa to 50 Pa). Advantageously, the vacuum thus created can improve reaction efficiency reducing collisional losses with stray gas atoms that diffuse into chamber 235 during operation.

Figure 7:
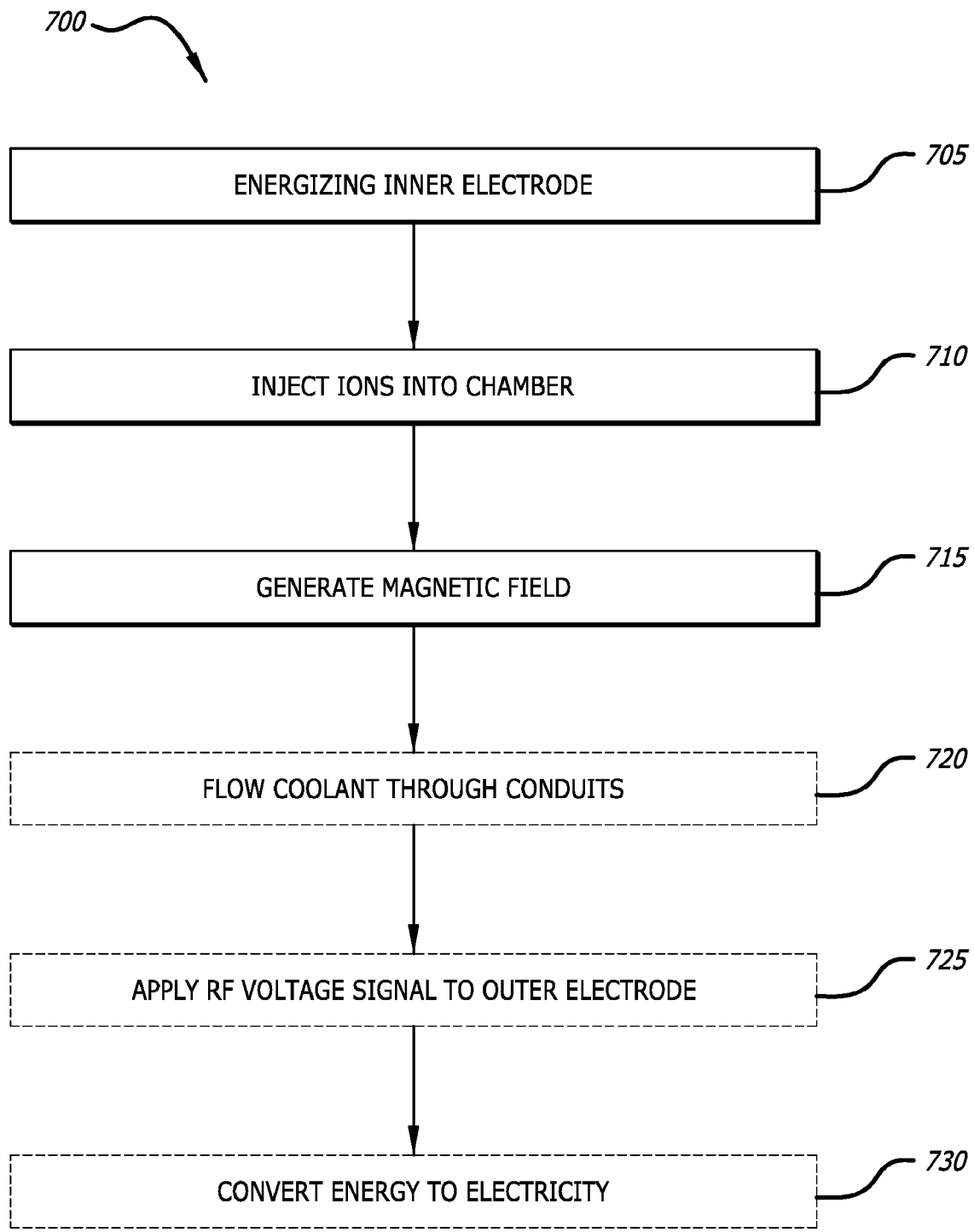
FIG. 7 is a block flow diagram illustrating an example process for generating energy or neutrons using an orbital confinement reactor device, in accordance with some embodiments.

In terms of the triple product figure of merit, higher number densities implicate higher magnetic fields in chamber 235, permitting higher electron flux to offset space charge effects, while maintaining temperature and confinement time in ranges corresponding to a target for the intended fusion operating regime, as described in more detail in reference to FIG. 7. To that end, example reactor device 200 operates at number densities from about $1 \times 10^{11}$ to about $1 \times 10^{18}$ atoms/cm$^3$, from about $1 \times 10^{12}$ to about $1 \times 10^{18}$ atoms/cm$^3$, from about $1 \times 10^{13}$ to about $1 \times 10^{18}$ atoms/cm$^3$, from about $1 \times 10^{14}$ to about $1 \times 10^{18}$ atoms/cm$^3$, from about $1 \times 10^{15}$ to about $1 \times 10^{18}$ atoms/cm$^3$, from about $1 \times 10^{16}$ to about $1 \times 10^{18}$ atoms/cm$^3$, from about $1 \times 10^{17}$ to about $1 \times 10^{18}$ atoms/cm$^3$, including fractions or interpolations thereof. For example, example reactor device 200 can operate from about $1 \times 10^{13}$ to about $1 \times 10^{15}$ atoms/cm$^3$ to maintain net positive energy output from example reactor device 200.

FIG. 2C is a schematic diagram illustrating example reactor device 200 incorporating a two-part outer anode 210 in three-quarter section, in accordance with some embodiments. The sectional view in FIG. 2C is intended to illustrate the rotational symmetry of example reactor device 200 about longitudinal axis 230. As described in reference to FIG. 2A and FIG. 2B, example reactor device 200, and constituent elements such as inner electrode 205, outer electrode 210, magnetic field generators 215, and chamber 235.

FIG. 3 is a schematic diagram illustrating an example ion injection system 300, in accordance with some embodiments. Example ion injection system 300 is illustrated without other components of example reactor device 200, but it is understood that the elements described represent components of an example fuel ion source 110 as coupled with example reactor device 200, configured to inject ions into chamber 235. Example ion injection system 300 includes an ion source 305 and beam optics 310 to form and inject ions 315 into chamber 235.

Ion source 305 is illustrated as a plasma-based ion source, such as a duoplasmatron, an electron cyclotron resonance device, microwave-induced plasma device, inductively-coupled ion source or other device configuration that generates an ion-rich plasma. In some embodiments, ion source 305 includes a duoplasmatron. In the illustrative example of a duoplasmatron, an ion beam is produced from a plasma that has been confined within a hollow chamber between the anode and the cathode. The ions 315 are accelerated, collimated, shaped, and/or focused using beam optics 310 such as an Einzel lens. For example, to generate a proton beam, a hydrogen containing source gas can be dissociated in the plasma and the beam of hydrogen ions can be subsequently extracted by an extractor grid, shaped, collimated, and steered into aperture 290. A similar approach can be applied to form beams of larger ions, based on selection of the ion source gas. In some embodiments, ions 315 are injected into chamber 235 via aperture 290, at a trajectory likely resulting in trapping the ion 315 in an orbit 320 about inner electrode 205, as described in more detail in reference to FIG. 2A and FIG. 2B. The trajectory can correspond to an angle that is tangential to a surface of the inner electrode. The tangential angle can improve trapping efficiency and can coalesce ions 315 into orbit 320.

While the term "optics" is used, it is understood that components of beam optics 310 operate by application of electric fields to form ions 315 into a beam and to redirect the beam of ions 315 into chamber 235 via aperture 290. Similarly, while FIG. 3 illustrates only a portion of a section through example reactor device 200 along longitudinal axis 230, it is understood that in the exemplary configuration illustrated, outer electrode 210 and inner electrode 205 are rotational solids, symmetric about longitudinal axis 230.

FIG. 4 is a schematic diagram illustrating example reactor device 200 and an example magnetic field generator 215 configuration, in accordance with some embodiments. Example magnetic field generator 215 configuration can be implemented in example reactor device 200, as described in more detail in reference to FIG. 2A and FIG. 2B. Example magnetic field generator 215 configuration includes magnetic field generators 215, disposed around chamber 235 to generate a magnetic field 405 substantially parallel to longitudinal axis 230 within chamber 235.

Magnetic field generators 215 can be arranged about chamber 235 such that within chamber 235 the polarity of magnetic field 405 is aligned with longitudinal axis 230. In some embodiments, magnetic field 405 can be oriented with a first polarity such that electrons emitted from inner electrode 205 are forced to orbit in the same direction as positive ions in accordance with the Lorentz force applied to electrons. In some embodiments, magnetic field 405 can be oriented with a second polarity, approximately opposite to the first polarity, such that electrons emitted from inner electrode 205 are forced to orbit in the opposing direction to positive ions.

For example, at stronger magnetic field strength, in excess of the Hull cut-off condition, electrons emitted into the chamber 235 are forced back to inner electrode 205 rapidly, avoiding a short between electrodes 205 and 210 and reducing space-charge effects that in turn permit densification of the fusion plasma. At weaker magnetic field strength, by contrast, electrons can be emitted without being deflected from outer electrode 210 and can cause a short or an arc to form in the fusion plasma. To maintain a fusion plasma within a target range of the fusion triple product, magnetic field 405 used to trap electrons in an orbital path about the inner electrode 205 within the chamber 235 can be applied at from about 0.01 Tesla to about 10.0 Tesla, from about 0.01 Tesla to about 9.0 Tesla, from about 0.01 Tesla to about 8.0 Tesla, from about 0.01 Tesla to about 7.0 Tesla, from about 0.01 Tesla to about 6.0 Tesla, from about 0.01 Tesla to about 5.0 Tesla, from about 0.01 Tesla to about 4.0 Tesla, from about 0.01 Tesla to about 3.0 Tesla, from about 0.01 Tesla to about 2.0 Tesla, from about 0.01 Tesla to about 1.9 Tesla, from about 0.01 Tesla to about 1.8 Tesla, from about 0.01 Tesla to about 1.7 Tesla, from about 0.01 Tesla to about 1.6

Tesla, from about 0.01 Tesla to about 1.5 Tesla, from about 0.01 Tesla to about 1.4 Tesla, from about 0.01 Tesla to about 1.3 Tesla, from about 0.01 Tesla to about 1.2 Tesla, from about 0.01 Tesla to about 1.1 Tesla, from about 0.01 Tesla to about 1.0 Tesla, from about 0.01 Tesla to about 0.9 Tesla, from about 0.01 Tesla to about 0.8 Tesla, from about 0.01 Tesla to about 0.7 Tesla, from about 0.01 Tesla to about 0.6 Tesla, from about 0.01 Tesla to about 0.5 Tesla, from about 0.01 Tesla to about 0.4 Tesla, from about 0.01 Tesla to about 0.3 Tesla, from about 0.01 Tesla to about 0.2 Tesla, from about 0.01 Tesla to about 0.1 Tesla, or from about 0.01 Tesla to about 0.05 Tesla, including fractions or interpolations thereof.

Figure 5:
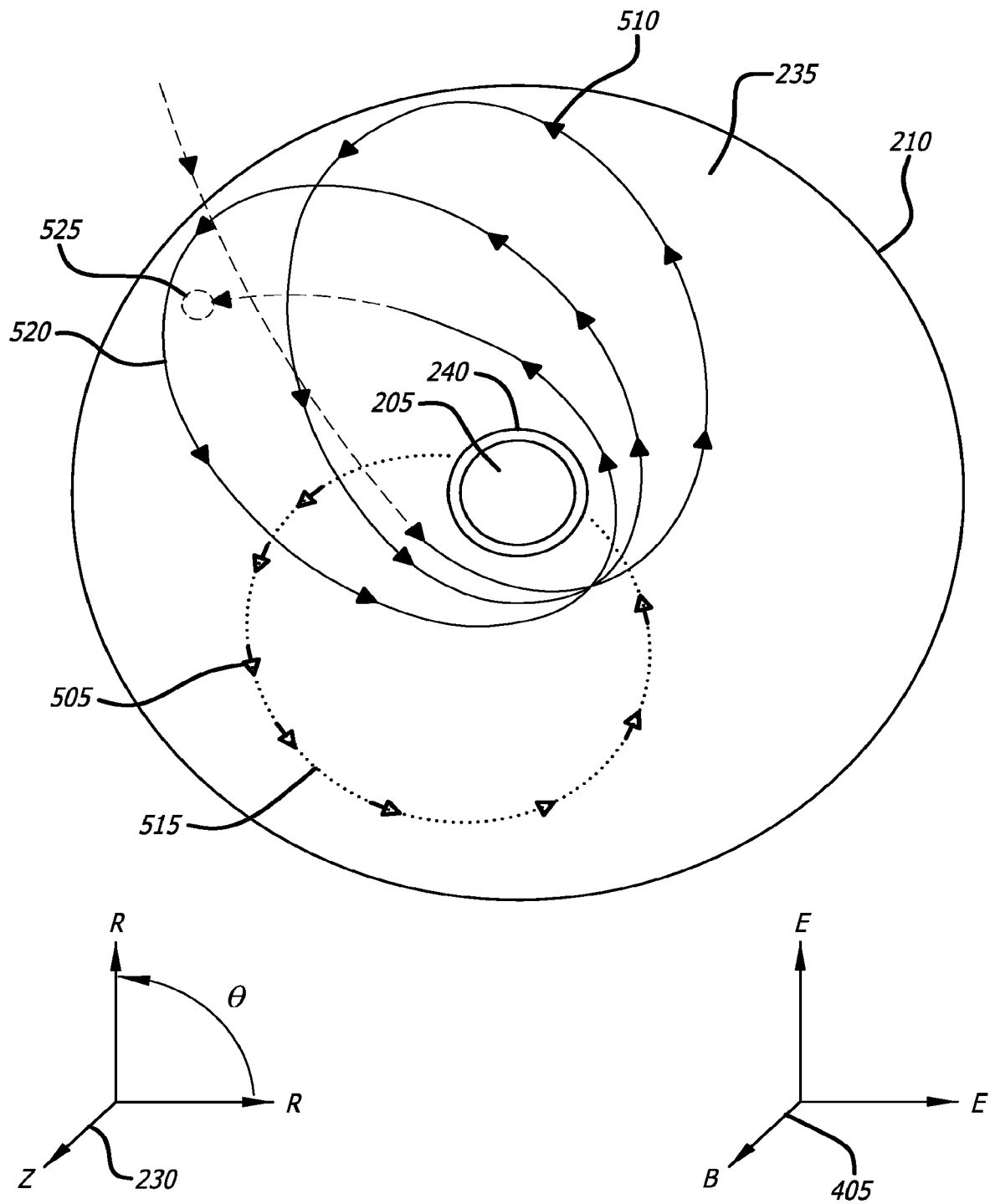
FIG. 5 is a schematic diagram illustrating an end-view representation of emitted electron and orbiting ion interactions, in accordance with some embodiments.

FIG. 5 is a schematic diagram illustrating an end-view representation of the example reactor device 200 of FIG. 2, describing orbital paths of emitted electrons 505 and orbiting ions 510, in accordance with some embodiments. The orbit paths illustrated are not drawn to scale, but rather are intended to illustrate concepts of the operation of example reactor device 200. It is understood that the shape, relative dimensions, and orbiting paths indicated by arrows are illustrative and non-limiting.

As described in more detail in reference to FIG. 2, during operation of example reactor device 200, ions 510 are injected tangentially between inner electrode 205 and outer electrode 210 and into an electrostatic field with sufficient energy to assume stable elliptical orbits around inner electrode 205. During an elliptical orbit 520, ions 510 accelerate towards the negatively biased inner electrode 205, converting potential energy into kinetic energy, until reaching the perigee point of the elliptical orbit 520. After reaching perigee, ions 510 decelerate while moving away from the negative cathode potential and storing potential energy until reaching the apogee point of the elliptical orbit 520. Ions 510 can complete millions of elliptical orbits 520 in the reactor over a period of time on the order of one second. Additionally, the elliptical ion orbit 520 can exhibit apsidal precession around the central cathode 205 such that elliptical orbits 520 of ions 510 can cross elliptical orbits of other ions 510 up to and exceeding millions of times, increasing the probability of a relatively unlikely fusion event 525 to occur. Eventually, collisions between ions 510 in overlapping orbital trajectories result in fusion events 525, releasing fusion reaction products, including but not limited to charged particles (alphas, helium-3, protons, tritium, etc.), radiation, and thermal energy.

Inner electrode 205, including emitter material 240, injects electrons 505 into chamber 235. Through interaction with magnetic field 405, electrons 505 are bent into partial orbits around inner electrode 205, eventually returning to inner electrode 205. In some embodiments, emitter material 240 is an isotropic emitter, such that electrons are emitted in all radial directions substantially equally, which is demonstrated by multiple electron orbital paths 515. As a result, the influence of electrons 505 on ion 510 density in chamber 235 can be substantially uniform about inner electrode 205. Advantageously, maintaining a substantially symmetrical electron 505 distribution about inner electrode 205 can reduce self-structuring in plasmas that may inhibit nuclear fusion, induce arc runaway, or introduce other operational issues.

Figure 6:
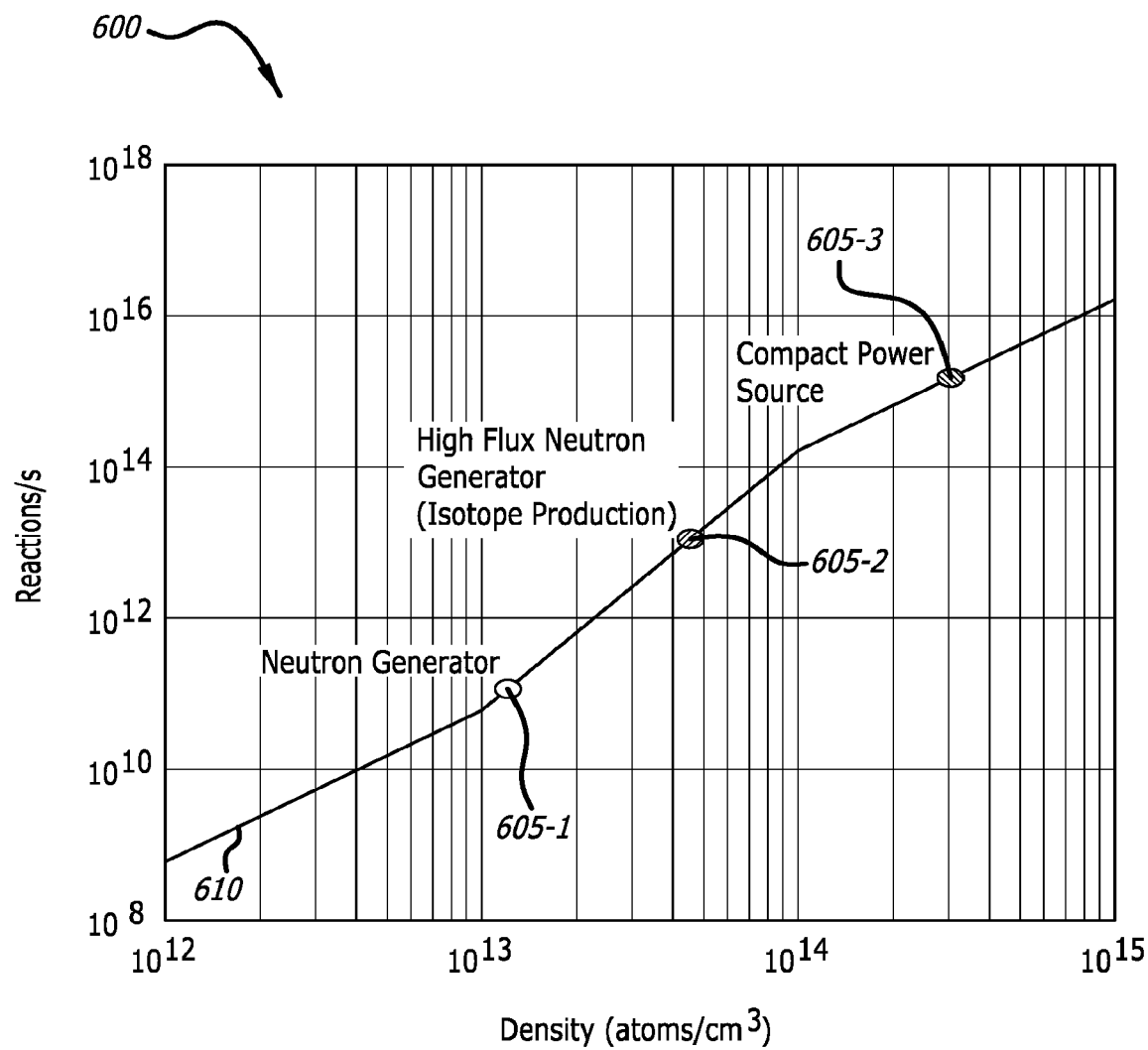
FIG. 6 is a graph illustrating reaction rate (ordinate) and density (abscissa) for an example orbital confinement reaction device, at 125 keV average electron temperature for three key design points, in accordance with some embodiments.

FIG. 6 is a graph 600 illustrating reaction rate (ordinate) and ion density (abscissa) for an example orbital confinement reactor device 105 in accordance with some embodiments. Graph 600 illustrates different operating regimes 605 characterized by different ion density, measured in atoms/$cm^3$, and reaction rate, measured in fusion events per second, plotted along an operating curve 610 describing an illustrative operational window of example device 105. It is understood that the details described in reference to example reactor device 200, such as operating parameters, internal structures, and material configurations can be configured such that example system 100 operates in one or more of the operating regimes 605. The operating regimes 605 correspond to different applications as described in more detail in reference to FIG. 1. For example, graph 600 includes a first regime 605-1, where example device 105 operates as a neutron generator applied, for example, to neutron-based imaging. A second regime 605-2 describes operation as a high-flux neutron generator, for example, in isotope production for medical use. A third regime 605-3 describes operation as a compact power source, whereby the reaction rate and ion density are high enough to generate net-positive energy out of the example device 105.

As described in more detail in reference to the FIGS. 1-5, operating regimes 605 are not discrete, but rather are included as examples within the range of operating curve 610 to illustrate the dependency of reaction rate on ion density, for a given set of conditions. For example, operating curve 610 can describe the relationship between ion density and reaction rate for a given electron temperature, operating pressure, magnetic field strength, etc. For graph 600, operating curve 610 describes values of reaction rate and ion density for an example device 105 operating at 125 keV average electron temperature.

Graph 600 illustrates that example device 105 can operate as a neutron source and/or as a power source, but that different operating regimes 605 can implicate different operating parameters and configurations. Structurally, a specialized neutron generator device can exclude one or more components used to extract power from the fusion plasma, including but not limited to image current circuit 250, dielectric insulator 255, or compound outer electrode shells 210-1 and 210-2. Graph 600 also illustrates the influence of ion density on ion temperature, and how ion density and ion temperature are correlated with recirculation frequency and fusion cross section (a), as described in more detail in reference to the theoretical introduction above.

Advantageously, net fusion power exceeding 1 kW, corresponding to third operating regime 605-3, can be generated by example device 105 having a chamber size on the order of 10 cm. Chamber size can be described by a range within which example device 105 operates as described in reference to FIG. 6. For example, the inner radius, corresponding to the radius of inner electrode, can be from about 0.1 cm to about 40.0 cm. As the inner radius decreases, however, the electron flux and/or number of electrons injected from emitter material 240 into chamber 235 may also decrease such that the design approaches that of the Kingdon trap, which becomes limited in its electron emission due to reduced surface area, and thus the number of fusion events that can take place per given period of time does not generate net positive energy output. In contrast, where the distance between inner electrode 205 and outer electrode 210 is relatively small, loss mechanisms such as ion collision with inner electrode 205, Bremsstrahlung losses, and electron arcing or shorting with outer electrode 210 become significant, thereby reducing fusion reaction rate. In this way, inner electrode can have a radius ranging from about 0.1 cm to about 40.0 cm, from about 0.1 cm to about 30.0 cm, from about 0.1 cm to about 20.0 cm, from about 0.1 cm to about 15.0 cm, from about 0.1 cm to about 10.0 cm, from about 0.1 cm to about 9.5 cm, from about 0.1 cm to about 9.0 cm, from about 0.1 cm to about 8.5 cm, from about 0.1 cm to about 8.0 cm, from about 0.1 cm to about 7.5 cm, from about 0.1 cm to about 7.0 cm, from about 0.1 cm to about 6.5 cm, from about 0.1 cm to about 6.0 cm, from about 0.1 cm to about 5.5 cm, from about 0.1 cm to about 5.0 cm, from about 0.1 cm to about 4.5 cm, from about 0.1 cm to about 4.0 cm, from about 0.1 cm to about 3.5 cm, from about 0.1 cm to about 3.0 cm, from about 0.1 cm to about 2.5 cm, from about 0.1 cm to about 2.0 cm, from about 0.1 cm to about 1.5 cm, from about 0.1 cm to about 1.0 cm, or from about 0.1 cm to about 0.5 cm, including fractions and interpolations thereof.

Analogously, the dimensions of outer electrode 210 are similarly characterized by a range within which example device 105 operates as described in reference FIG. 6. For example, the outer radius, corresponding to the radius of outer electrode 210 facing chamber 235, can be from about 1 cm to about 20 cm. As the outer radius decreases, the electron flux into outer electrode 205 may increase, such that the effect of electron injection on space charge is mitigated, reducing the ion density and shifting the device to the left on operating curve 610. Similarly, when outer radius increases, the energy needed to maintain compact orbits for ions and electrons increases, as the distance between chamber 235 and magnetic field generators 215 increases. In this way, outer electrode can have a radius ranging from about 1 cm to about 100 cm, from about 1 cm to about 90 cm, from about 1 cm to about 80 cm, from about 1 cm to about 70 cm, from about 1 cm to about 60 cm, from about 1 cm to about 50 cm, from about 1 cm to about 40 cm, from about 1 cm to about 30 cm, from about 1 cm to about 20 cm, from about 1 cm to about 19 cm, from about 1 cm to about 18 cm, from about 1 cm to about 17 cm, from about 1 cm to about 16 cm, from about 1 cm to about 15 cm, from about 1 cm to about 14 cm, from about 1 cm to about 13 cm, from about 1 cm to about 12 cm, from about 1 cm to about 11 cm, from about 1 cm to about 10 cm, from about 1 cm to about 9 cm, from about 1 cm to about 8 cm, from about 1 cm to about 7 cm, from about 1 cm to about 6 cm, from about 1 cm to about 5 cm, from about 1 cm to about 4 cm, from about 1 cm to about 3 cm, or from about 1 cm to about 2 cm, including fractions and interpolations thereof.

FIG. 7 is a block diagram illustrating an example process 700 for generating energy or neutrons using an orbital confinement reactor device, in accordance with some embodiments. The blocks of example process 700 represent operations that can be implemented autonomously (e.g., without human intervention) by a computing device. The computing device can be or include control circuitry operably coupled with the components of the orbital confinement reactor device, such as example reactor device 200 of FIG. 2A, FIG. 2B, and FIG. 2C, such that the operations of example process 700 can be dynamically controlled in terms of timing, frequency, and/or magnitude, as part of a control scheme to maintain criticality (e.g., k≈1) of nuclear fusion in chamber 235. As such, it is understood that some of the operations illustrated in FIG. 7 can be omitted, reordered, and/or repeated, depending, for example, on the target application of example reactor device 200.

At block 705, example process 700 includes energizing inner electrode 205. The voltage applied to inner electrode 205, for example, by high voltage power source 220, can be from 50 kV DC to about 4.0 MV DC, including fractions thereof, as described in more detail in reference to FIG. 2A. Energizing inner electrode 205 serves to trap ions into elliptical orbits about longitudinal axis 230, as described in more detail in reference to FIG. 5, and also serves to increase emission of electrons from emitter material 240 by field emission. Heating of inner electrode 205 can increase electron emission from the emitter material 240 through thermionic emission. Heating can be active, through resistive heating elements or by resistive heating of emitter material 240, or can be passive through electron and ion collisions with inner electrode 205.

At block 710, example process 700 includes injecting ions into chamber 235. As described in more detail in reference to FIG. 3, ions 315 can be injected into chamber 235 at an angle tangential to a surface of the inner electrode. Injection at the tangential angle can cause the ions to interact with the electrostatic field and enter orbit 320 about the inner electrode 205. Injecting ions can be an intermittent or a continuous process, as part of maintaining criticality by managing ion energy and population parameters during operation of example reactor device 200. In some embodiments, ion injection can be manipulated as a control variable as part of a closed loop control system.

At block 715, example process 700 includes generating magnetic field 405 in chamber 235. Magnetic field 405 can be generated by magnetic field generators 215, aligned with longitudinal axis 230, using an arrangement of magnetic field generators 215 that creates a magnetron in chamber 235. As part of trapping electrons in chamber 235, magnetic field 405 can be characterized by an intensity corresponding to a Hull cut-off condition that redirects the electrons back toward inner electrode 205. As described in more detail in reference to FIG. 5, electron orbits 515 can be partial, such that electrons may form a substantially circular orbit that does not complete a circuit about inner electrode 205, although complete orbits of electrons may occur.

In some embodiments, example process 700 can optionally include flowing coolant through conduits 285. Where power dissipation in example reactor device 200 generates heat, flowing coolant through conduits 285 can extract thermal energy from fusion reactions and can serve as a control parameter to maintain stable reactor operation. As described in more detail in reference to FIG. 1, heat removed from example reactor device 200 can be converted to electricity using thermoelectric generators, turbines, or the like, or can be used for heat through coupling with heat exchangers. In some embodiments, the coolant can be or include materials that are liquid at elevated temperature and/or pressure, such as up to and including 1000 K.

As part of power generation in the context of example system 100 of FIG. 1, example process 700 can optionally include applying an RF voltage signal to outer electrode 210 at block 725. Axial harmonic motion of orbiting ions can be damped by application of RF voltage to image current circuit 250. In this way, electricity can be directly extracted from fusion plasmas and can be transformed into usable electricity by power electronics, including but not limited to inverters or rectifiers.

As such, using heat and electrical energy extracted from example device, example process 700 can optionally include converting energy to electricity at block 730. For example, where example reactor device 200 is operating as a power source (e.g., third operating regime 605-3 of FIG. 6), net fusion power out of the example device 200 can be converted to electricity for distribution to the grid and/or for storage in capacitors, batteries, pumped storage, or the like. In contrast, where example reactor device 200 is operating as a neutron source, direct electrical generation of block 725 can be omitted and example reactor device 200 can operate without connection to thermal generators 120.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The embodiments of the invention in which an exclusive property or privilege is claimed are defined as follows:

1. An orbital confinement fusion device, comprising:
   a high voltage power source;
   a cathodic inner electrode electrically coupled to the high voltage power source and defining a longitudinal axis of the device, the inner electrode having an emitter material;
   an anodic outer electrode concentric with the longitudinal axis and spaced apart from the cathodic inner electrode to define a chamber therebetween for confining fusion plasma therein, the outer electrode comprising:
      a first anode shell and a second anode shell, disposed laterally relative to the longitudinal axis; and
      a dielectric insulator disposed between and electrically isolating the first anode shell and the second anode shell; and
   a plurality of magnetic field generators disposed in a coaxial arrangement and positioned radially outward from the anodic outer electrode relative to the longitudinal axis, the plurality of magnetic field generators configured to form a magnetic field parallel to the longitudinal axis in the chamber,
   wherein the emitter material is configured to inject electrons into the chamber when the cathodic inner electrode is energized by the high voltage power source.

2. The device of claim 1, wherein the inner and outer electrodes are solids of revolution, symmetric about the longitudinal axis, and are shaped to form a substantially logarithmic electrostatic field in the chamber when energized.

3. The device of claim 1, wherein the inner electrode is characterized by an aspect ratio greater than one along the longitudinal axis, and wherein the outer electrode has a length along the longitudinal axis greater than a largest diameter of the inner electrode.

4. The device of claim 1, wherein the magnetic field is characterized by a magnetic field strength exceeding a Hull cut-off condition to trap electrons in an orbital path about the inner electrode within the chamber.

5. The device of claim 1, wherein the magnetic field strength is from about 0.01 T to about 10 T.

6. The device of claim 1, wherein the plurality of magnetic field generators comprises permanent magnets.

7. The device of claim 1, wherein the plurality of magnetic field generators comprises electromagnets.

8. The device of claim 1, wherein the high voltage power source is operative in a range from about 50 kV DC to about 4.0 MV DC.

9. The device of claim 1, wherein the inner electrode defines a first end and a second end, the device further comprising:
   a first dielectric insulator mechanically coupled with the first end and isolating the first end from the outer electrode; and
   a second dielectric insulator disposed in the chamber between the second end and the outer electrode and isolating the second end from the outer electrode.

10. The device of claim 9, wherein the first dielectric insulator defines an insulating cavity and electrically isolates the high voltage power source from the outer electrode.

11. The device of claim 1, wherein the outer electrode defines an aperture, an alignment of the aperture defining an injection trajectory, the injection trajectory corresponding to a pitch angle of entry of a stable elliptical orbit of an ion of a given mass-to-charge ratio about the inner electrode.

12. The device of claim 11, wherein the ion is a proton (m/z=1), a deuterium ion (m/z=2), a tritium ion (m/z=3), lithium-6 ion (m/z=6), or a boron-11 ion (m/z=11).

13. The device of claim 1, wherein the outer electrode further defines a port fluidically coupled with the chamber and an external environment, the port being configured to fluidically couple with a vacuum system.

14. The device of claim 1, wherein the emitter material is disposed on the inner electrode or in the inner electrode, and wherein the emitter material is configured to inject electrons into the chamber in accordance with the inner electrode being energized.

15. The device of claim 1, wherein the emitter material is a thermionic emitter material.

16. The device of claim 1, further comprising an image current device electrically coupled with the outer electrode and configured to generate electrical energy from a plurality of charged particles orbiting the inner electrode, the plurality of charged particles exhibiting harmonic axial motion aligned with the longitudinal axis.

17. The device of claim 1, further comprising a fluid conduit disposed in the outer electrode or the inner electrode.

18. The device of claim 1, wherein the device is characterized by physical dimensions on the order of tens of centimeters.

* * * * *